July 21, 1942. E. R. LOCHMAN Re. 22,140
ELECTRIC TRACER CONTROL MACHINE FOR DIE SINKING AND THE LIKE
Original Filed April 30, 1934 7 Sheets-Sheet 1
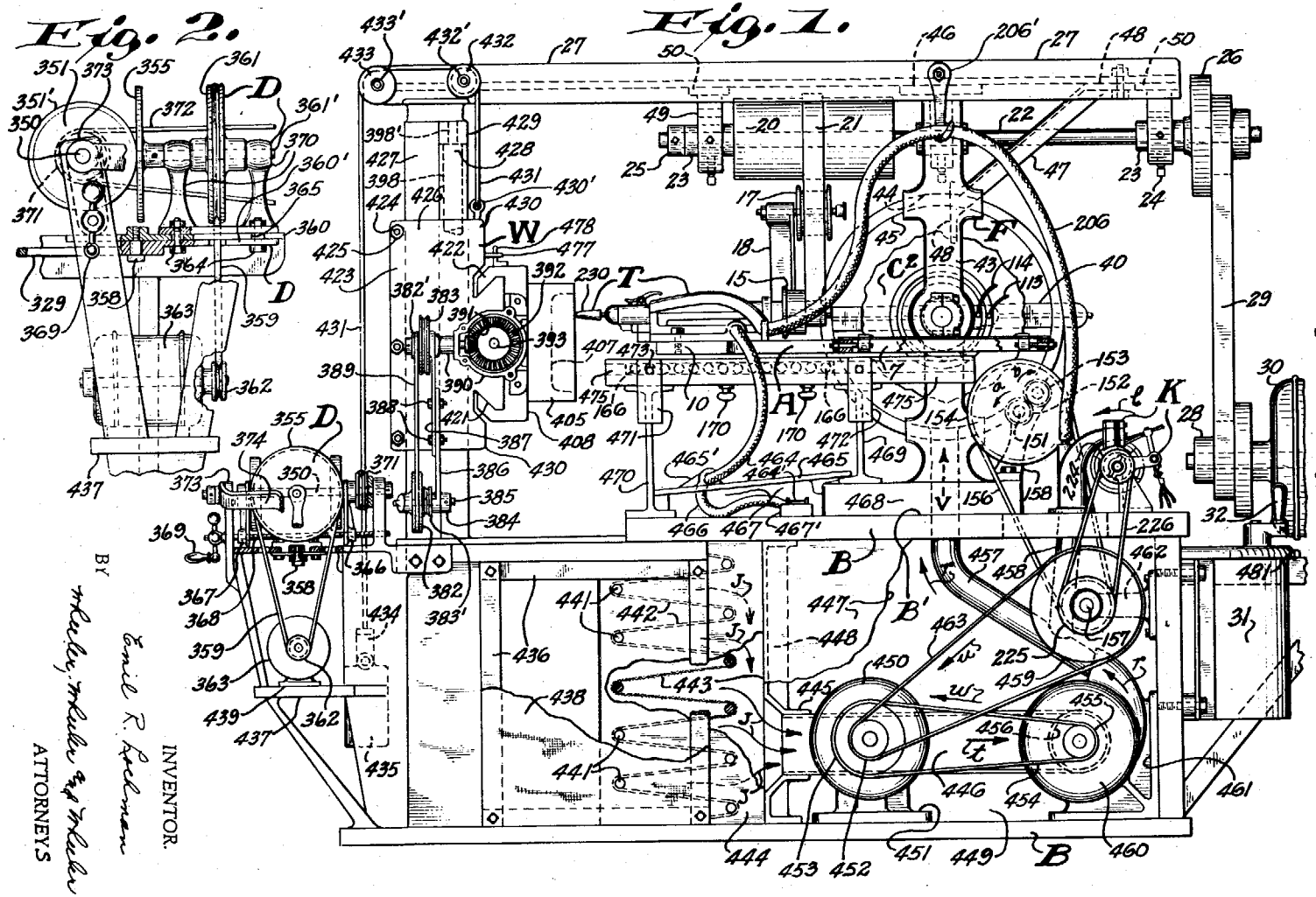
INVENTOR.
Emil R. Lochman
BY
Wheeler, Wheeler and Wheeler
ATTORNEYS July 21, 1942. E. R. LOCHMAN Re. 22,140
ELECTRIC TRACER CONTROL MACHINE FOR DIE SINKING AND THE LIKE
Original Filed April 30, 1934 7 Sheets-Sheet 2
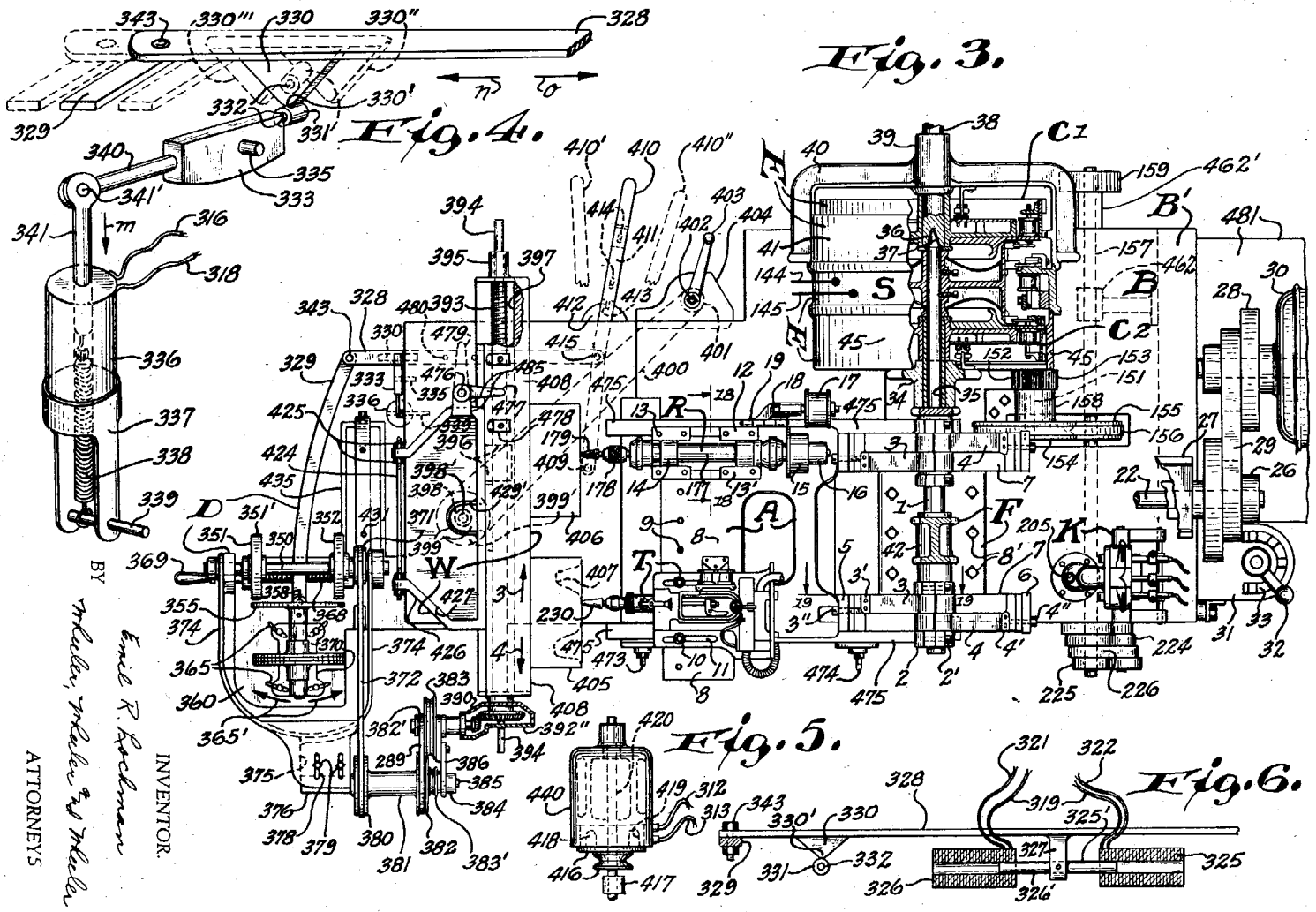
INVENTOR.
Emil R. Lochman
BY
Wheeler, Wheeler and Wheeler
ATTORNEYS

ELECTRIC TRACER CONTROL MACHINE FOR DIE SINKING AND THE LIKE

Original Filed April 30, 1934 7 Sheets-Sheet 3

INVENTOR.
Emil R. Lochman
BY
Wheeler, Wheeler and Wheeler
ATTORNEYS

July 21, 1942. E. R. LOCHMAN Re. 22,140

ELECTRIC TRACER CONTROL MACHINE FOR DIE SINKING AND THE LIKE

Original Filed April 30, 1934 7 Sheets-Sheet 4

INVENTOR.

Emil R. Lochman

BY Wheler, Wheler & Wheler

ATTORNEYS

July 21, 1942. E. R. LOCHMAN Re. 22,140

ELECTRIC TRACER CONTROL MACHINE FOR DIE SINKING AND THE LIKE

Original Filed April 30, 1934 7 Sheets-Sheet 5

INVENTOR.
Emil R. Lochman
BY
Wheeler, Wheeler and Wheeler
ATTORNEYS

July 21, 1942. E. R. LOCHMAN Re. 22,140
ELECTRIC TRACER CONTROL MACHINE FOR DIE SINKING AND THE LIKE
Original Filed April 30, 1934 7 Sheets-Sheet 6
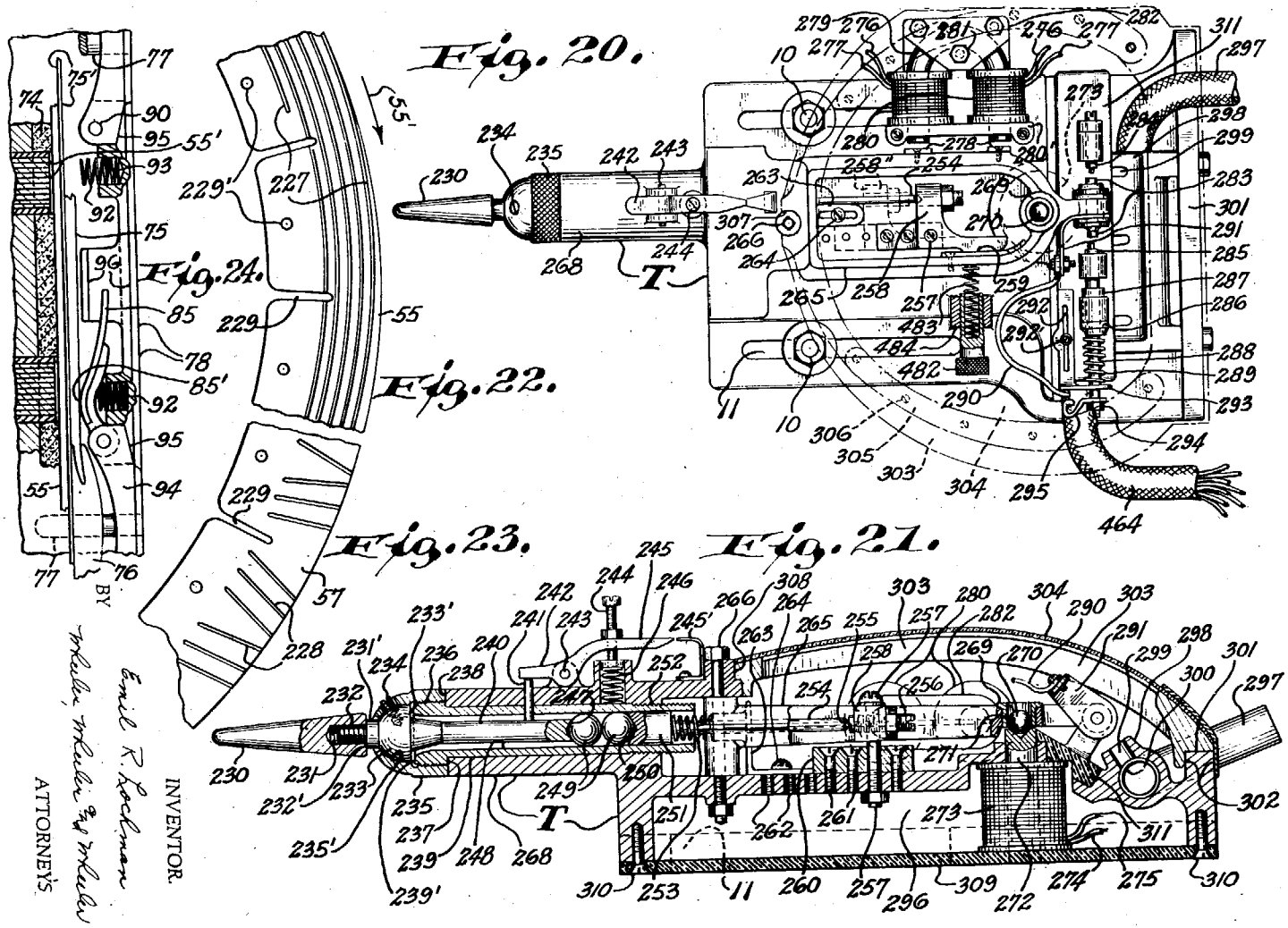
INVENTOR.
Emil R. Lochman
BY
Wheeler, Wheeler and Wheeler
ATTORNEYS.

July 21, 1942. E. R. LOCHMAN Re. 22,140
ELECTRIC TRACER CONTROL MACHINE FOR DIE SINKING AND THE LIKE
Original Filed April 30, 1934 7 Sheets-Sheet 7
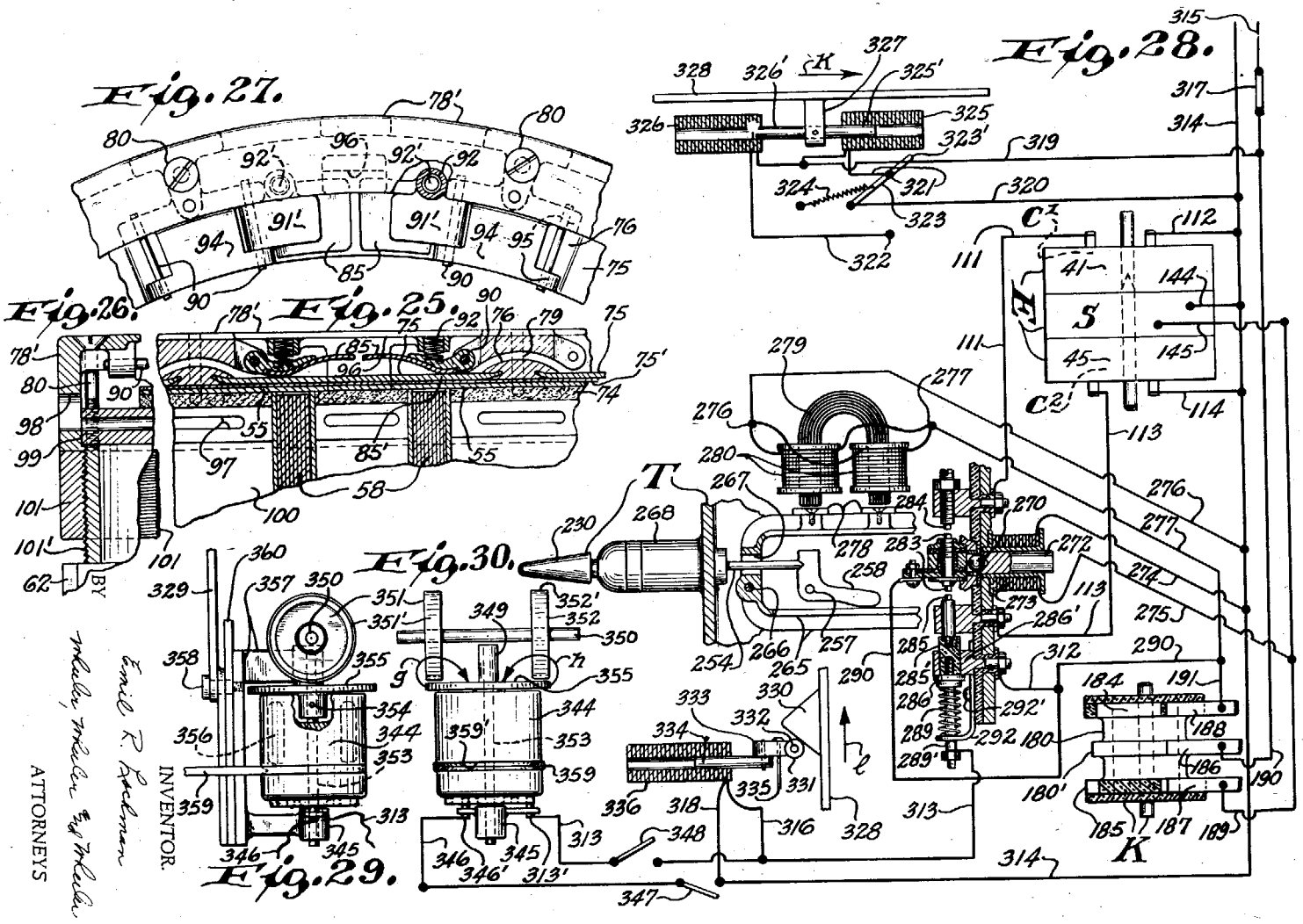
INVENTOR.
Emil R. Lochman
BY
Wheeler, Wheeler & Wheeler
ATTORNEYS Reissued July 21, 1942

Re. 22,140

UNITED STATES PATENT OFFICE 22,140

ELECTRIC TRACER CONTROL MACHINE FOR DIE SINKING AND THE LIKE

Emil R. Lochman, Milwaukee, Wis.

Original No. 2,254,229, dated September 2, 1941, Serial No. 723,105, April 30, 1934. Application for reissue September 2, 1941, Serial No. 409,319

62 Claims. (Cl. 90—13.5)

My invention relates to improvements in electric tracer-control machines for die sinking and the like.

It is the broad object of the present invention to render more delicate, sensitive, and rapid the operation of a machine of the class shown in my Patent No. 1,774,279 granted August 26, 1930. The apparatus disclosed in said patent and in the present application is of such a nature that any pattern, whether of metal or of non-conducting material such as wood, plaster, or the like, may be duplicated.

More specifically, the present invention seeks to improve over earlier devices in this art by providing an electrically controlled and preferably magnetically operated brake, the action of which supplements the controls for advancing and retracting the tracing point and tool, the several controls and the brake being subject to intermittent direct electric current which is automatically distributed alternately through the brake and through the actuating controls, so that each controller action is followed by a brake action and vice versa, thus enabling the apparatus to function much more sensitively and with greatly increased speed as compared with any previous device.

A further object of the invention is to utilize the two streams of interrupted direct current alternately at the tracer to sensitize the operation thereof.

It is also important that in the present invention I provide mechanical devices subject to vibration as a means of delivering the power of the magnets to the controllers and also to the brake, not only to increase the gripping action of the parts while the intermittent current is effective therein, but also to introduce a periodicity ensuring a prompt release of the gripping action.

A further object of the invention is to provide a connection from the control shaft to the carriage upon which the tracer and tool are mounted, which connection shall be absolutely free of lost motion to promote the greater accuracy and speed of operation of the carriage.

Another object of the invention is to provide a novel, improved drive for the work support including an automatic control, actuated by an overload circuit, provided in the tracer, for interrupting drive to the work support in the event that the rate of traverse employed is so high that the tracer and tool cannot move sufficiently rapidly to accommodate the drive.

Other objects of the invention include the provision of a novel mounting for the several armature parts of the controllers and brake, all of which are splined upon a gearlike transmitter or mounting carried by the control shaft, the provision of a novel and improved form of rotary interrupter and spark quenching device; the provision of a novel and improved mounting for the carriage upon which the tracer point and tool are disposed, the object being to enable this carriage to move backwardly and forwardly at a touch, to enhance the sensitivity of the machine and its delicateness of operation; the provision of means whereby a central blower system is employed to deliver dust free air to all portions of the machine requiring either cooling or an air blast, whereby tracers and points are protected from dirt which might otherwise be carried to them by such air; the provision of a novel and improved form of armature which will be relatively free of electromagnetic eddy currents and will tend to free itself of dust accumulations without scratching or destroying the coacting clutch plates; and finally, the provision of a new and highly sensitive tracer mechanism in which greater and more delicates response is assured and the arrangement of the tracer lever with respect to the contacts controlled thereby has been reorganized and improved.

In the accompanying drawings in which the same reference characters indicate the same parts in all of the views:

Figure 1 is a side elevation of the diesinking machine showing a side view of the principal features with parts broken away showing operating features located in the base of the machine.

Figure 2 is a side view of the drive for the work support, showing details of the friction drive and the location and connection of the driving motor.

Figure 3 is a plan view of the principal operating features of the machine as mounted on top of the box-like base, with the top beam 27 and its driving features removed, but showing the rear driving pulleys, variable speed motor and its controller.

Figure 4 is a perspective view of the operating mechanism for reversing the drive for the work support, including the solenoid 336, which is shown electrically connected in Figure 28.

Figure 5 is a plan view of a modified motor for the drive of the work support, showing a loose pulley and magnet drive connection.

Figure 6 is a side view and part sectional view of operating mechanism for reversing the drive of the work support automatically by means of solenoids (see Fig. 28).

Figure 20 is a plan view of the tracer with parts broken away to illustrate all of the operating parts in proper working position.

Figure 21 is a cross section of the tracer taken in a manner to fully illustrate the operating parts in their respective relation to each other.

Figure 22 is a plan view of a controller armature.

Figure 23 is a plan view of a brake armature.

Figure 24 is an enlarged detail of Figure 25 showing the armatures and magnet associated with a vibrator in proper working position.

Figure 25 is a cross section through the magnets like Figure 11, showing, however, the vibrators mounted on a vibrator cage direct for adjustment unitarily.

Figure 26 is a diametrical section of a controller like Figure 12, but showing the vibrator cage for adjusting the vibrators unitarily with its adjusting nut 101.

Figure 27 is a sectional plan view of the vibrator cage with a pair of vibrators in proper working position with the outer armature, also parts broken away to show details.

Figure 28 is a complete diagram of the electrical connection from the power line to the current breaker, from there to the tracer, and from there to the controllers and the brake, said three parts marked E comprising the control set; also an additional circuit affecting the work support and connected to the tracer, as well as a separate circuit affecting the reversing device for the work support.

Figure 29 is a side view of a modified driving and reversing device for the work support, modifying like parts as shown in Figure 2.

Figure 30 is a plan view of Figure 29 with arrows showing the magnetic circuit firmly connecting the effective parts for driving and reversing the work support.

Figure 7:
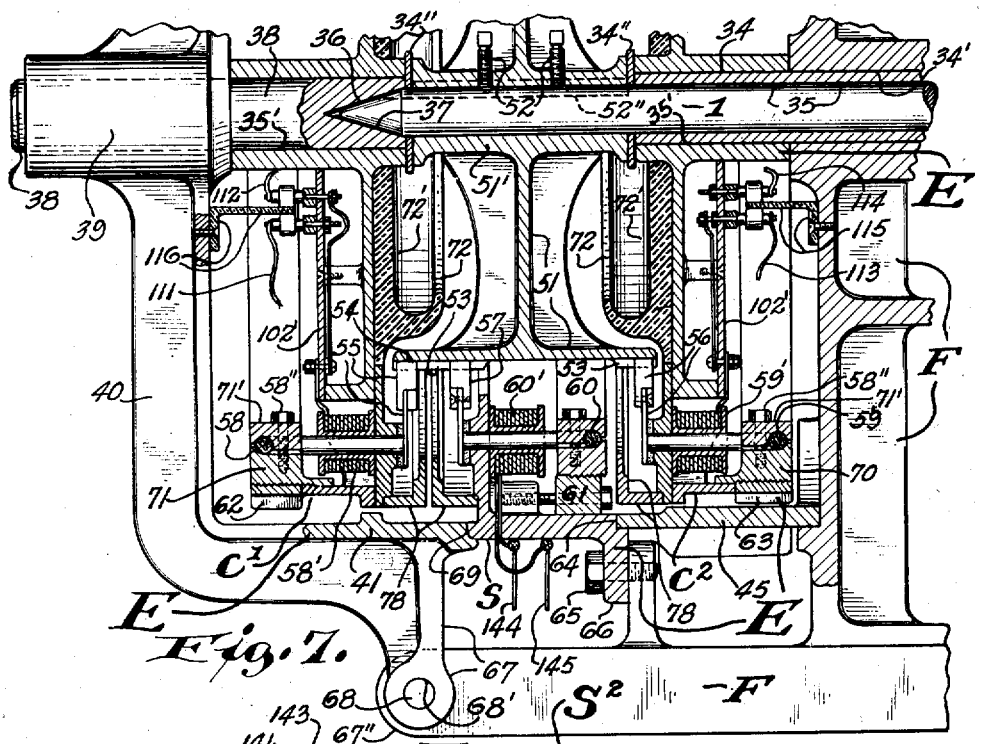
Figure 7 is a view of a control set E partly in side elevation and partly in axial section, showing the controllers, the brake, the armatures and transmitter.

Referring now more particularly to the drawings, it will be noted that the essential parts of the machine are marked with capital letters for easy reading of the more complicated assembly drawings, and for the same reason the figuring follows a continuous description of related parts of the machine.

The base of the machine B is of box shape and preferably of welded steel construction which is adaptable for various sizes of machines. The space within the base is used for auxiliary apparatus, while on the table-like top B′ the principal working elements of the machine are built up.

The frame F is rigidly mounted on the top B′ of the base with bolts 8′ and houses the control set E comprising three principal units, the controller C1, controller C2 and the brake S. A casing ring 45 is rigidly mounted in the seat 44 of the frame F, and the brake S is fitted with its seating groove 64 to said casing ring 45, and the brake S is rigidly mounted by lugs 66 to the frame F by screws 65 (see Fig. 7). The outer casing ring 41 in turn fits to the ring-like brake S with its seating groove 69, but said outer casing ring 41 is part of the outer frame casting 40 having hinge lugs 67 matching with hinge lugs 67″ of the frame F, all having the bore 68′, and said castings are connected for hinge action by the bolt 68 (see Fig. 7), while the upper lug 141 firmly secures said outer casting 40 to the frame F by the cap screws 142 (see Fig. 8). Thus the control set E forms a drum-like body in its outer appearance as shown in Fig. 3.

Figure 19:
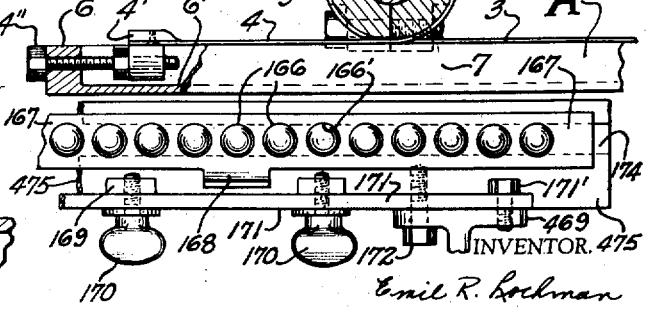
Figure 19 is a sectional side view on line 19—19 of Figure 3, showing a cross section of the control shaft and spring-band connection to the tool carriage, also the ball slide with its cage and stops.

The control shaft 1 has its bearing in sleeve 34 firmly mounted in bore 34′ of the frame F which also has a second bearing 42 for said control shaft 1, leaving free spaces of said shaft for mounting the spring drums 2, which are firmly clamped to said shaft after the flat ribbon or band springs 3 and 4 have been inserted in a suitable slot and held by screws 2″ by cap screws 2′. Said spring drums are made in two halves for clamping (see Fig. 19). The outer ends of said springs are securely fastened to the tension clips 3′—4′ extending into the hollow beams 7 of the tool carriage A which have lugs 5 and 6 at the ends through which the tension screws 4″ are loosely passed and screwed into said clips for tightening the bands 3 and 4, thus taking up all lost motion between the control shaft and the tool carriage, thereby assuring better finished work.

Figure 18:
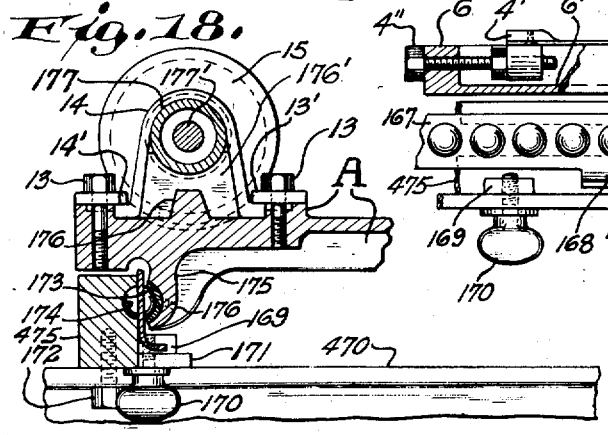
Figure 18 is a cross section on line 18—18 of Figure 3, showing details of construction of the tool carriage, its ballbearing slide and the mounting of the tool casing.

The tool carriage A (see Figs. 1, 3 and 19) has a straight surface 8 provided with holes 9 through which the tracer T is held in various adjusted positions, according to size and location of work, by the bolts 10, passed through slots 11, so that the tracer may be set forward or rearward according to the depth or thickness of the pattern 405 and work 406. The tool casing R is also endwise adjustable on the mounting rib 176 (see Fig. 18). The straps 14 hold the casing 177 in adjusted position by tightening the clamping plates 13' against the angles 14' of said straps, thus clamping the casing to the spacing block 176' by the capscrews 13. The tool spindle 177' is held in suitable ball bearings in said casing and extends at both ends, carrying the chuck 178 and the cutting tool 179 at the front, and the stepcone pulley 15—16 at the rear end.

The idler 17 is held in running position at the outer end of the bracket 18 having a hinge 19 adjustably held to the tool carriage A in a manner so it will take up the slack and guide the belt 21 along the driving drum 20 during the forward and rearward motions of the tool carriage, either on step 15 for slower driving or on step 16 for faster driving of the spindle and cutting tool 179.

The variable speed drive for the cutting or grinding tools has 24 variations, ranging from 185 to 3700 R. P. M., thus enabling the machine to be used for a great variety of work not possible with other machines, and made possible by the combination of said drive, where said drum 20 is mounted in parallel alignment with the tool spindle on shaft 22 turning in bearings 23 held adjustably in hangers 49 mounted by lugs 50 to beam 27, being held from endwise motion by set collar 25 and the stepcone 26 having three steps and matching with the three steps of stepcone 28 on variable speed motor 30 supplying four main speeds, which in turn are switched on by turning the crank 32 into steps 33 of controller 31. The brace 47 with its end flanges 48 bolted to frame F and beam 27 rigidly supports said rear end of beam 27 and shaft 22.

The outer controller C1 has a central bearing 35' by which it revolves on stub shaft 38 rigidly held in hub 39, and having a conical bore 37 into which the cone pointed end 36 of control shaft 1 fits and bears. This bearing cone is shaped so that the hinged part 40—41 together with said controller C1 may be swung outward on the hinge bolt 68 when any of the parts of the control set E need adjusting, or for inserting said parts in their respective places, which is done as follows.

Controller C2 with its bearing 35' is passed over the bronze bushing 34 on which it runs, then washer 34'' is passed over shaft 1, then transmitter 51 is passed on said shaft and rigidly fastened by key 52'' and set screws 52, then armature 56 with its internal gear teeth 54 is passed over the gear teeth 53 of the transmitter 51, both of said gears matching perfectly into each other to prevent lost motion, but allowing sliding or floating motion of the armatures endwise along the length of the teeth, so they may always be held in close sliding contact with the friction surface 74 preferably made of cork.

Figure 10:
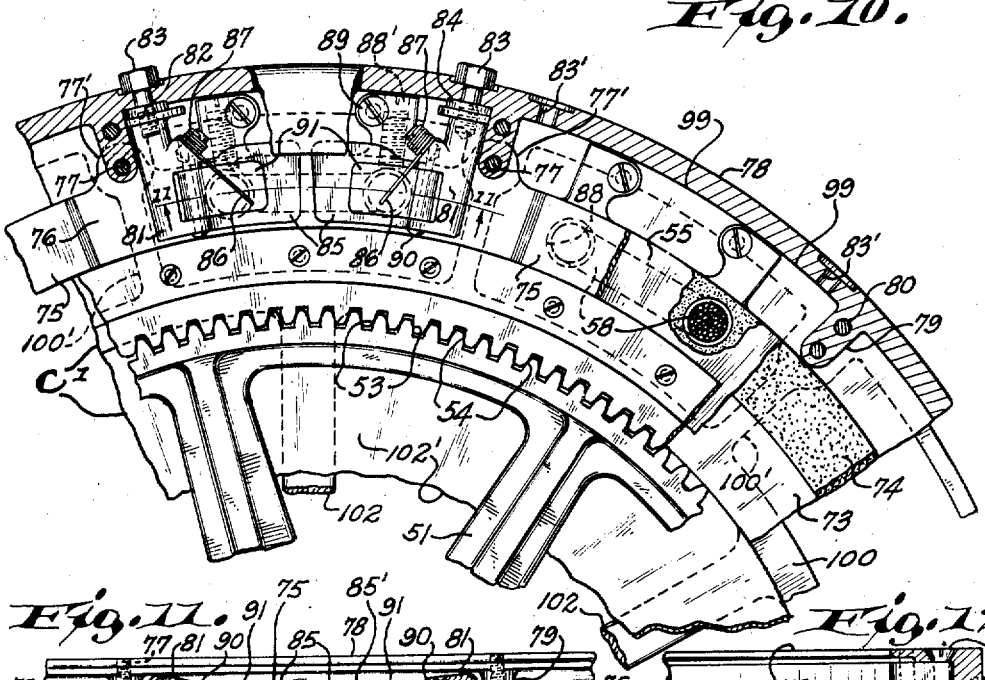
Figure 10 is a front view of a section of a controller, with parts broken away, showing the location of two magnets in proper relation to the armatures and the transmitter, also showing a pair of vibrators.
Figure 11:
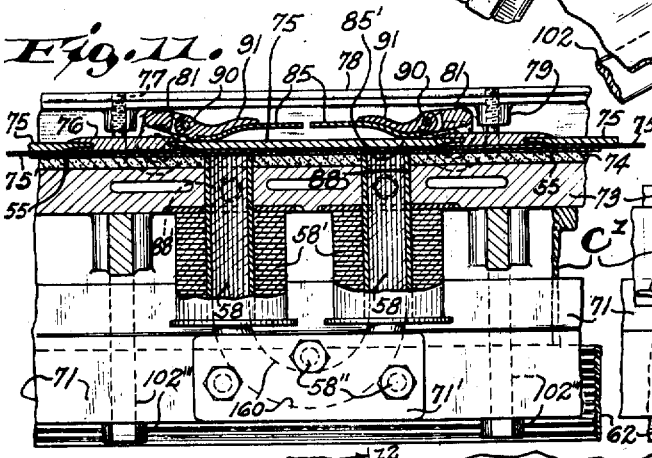
Figure 11 is a cross section through the magnets on line 11—11 of Figure 10, showing the proper working position of the vibrators in relation to the armatures and the magnet.
Figure 12:
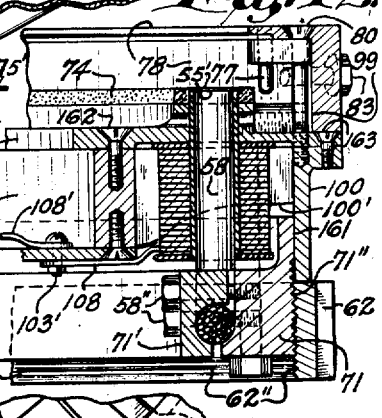
Figure 12 is a diametrical section of a controller with parts broken away, showing the parts for mounting and adjusting the magnets.

The vibrator ring 78, (see Figs. 10, 11, 12, 24, 25, 26 and 27) is passed over the transmitter and securely fastened by slotted screws 80 into its seat 99, in a manner such that the vibrators 85 will be held in position as shown in Fig. 11, where said vibrators are held in separate holders for individual adjustment for each vibrator by turning the holder so that the hinge formed by the non-magnetic part 91 with hinge pin 90 is adjusted so that the heel 85' of the vibrator 85 sets against the armature 75 as shown in Figs. 24, 25 and 11, and is then held in said position by tightening the cap screws 83 reaching through holes 33' into said holders 81 (see Fig. 10). The regular adjustment of the entire series of vibrators, of which there are ten pair of twenty single vibrators in each controller in the present machine, is done by adjustably turning the large ring-like nut 101, and when adjusted as shown in Fig. 25, said ring and nut are held in said position by tightening screws 80.

The brake S is next passed over the transmitter and held in proper alignment by said groove 64 and held rigidly by said respective screws 65. Then the brake armature 57 is passed over the transmitter; then another vibrator ring, preferably one with individual adjustments for the vibrators, and held in position by screws 80 in rigid stationary brake position. The brake S2 (see Fig. 8) is like the brake S in all essential features. However, its ring or channel-like body is larger in diameter and is mounted over the outside of casing ring 45 in rigid alignment therewith; the solenoid magnet 122 is mounted in the channel 127 of the brake ring, the vibrator ring 139 (see Fig. 9) is firmly mounted on the brake ring with screws 139', its raised rim having slots 138 through which the vibrators 120 are loosely passed while they are pivotally mounted to adjusting screws 135 and adjusting nuts 134 by pivots 133; the magnet core is loosely passed through the outer free end of the vibrator and inserted into loose sliding contact into the fiber bushing 126 of the magnet coil 122. The cone and socket joint 123' has a suitable gap, set properly for producing the strongest pull of the core 121, by setting the core plug 123 lengthwise in its bore 124 and holding it rigidly by set screw 125. In said adjusted vibrating position the pin 121' driven in the outer end of the core 121 is holding the core from turning by the small ribs 120' while pulling the long outer section in vibrating pulls at the rate of about 60 times per second and gripping the armature at the same rate of speed with the shoe 136 held to the inner short section of the vibrator by pivot 137.

It will be noted that the magnetic pull is more than doubled by the lever action of the vibrator against the brake armature 57 with the outer armature 136' (see Fig. 9) to which said brake shoes 136 are attached. It will further be noted that no magnetic flux passes the brake armature 57 in brake S2 which is preferable for some classes of work. The transmitter of said brake is holding the armatures 55, 56 and 57 on pins 117, and the brake armature 57 is held in a gap by ring 119 held by screws 118. The use of pins for holding the armatures has the advantage that for very large control sets said armatures may be made in sections, which are easier to keep straight and hug the friction surface 74 (see Figs. 10, 11 and 24) which is alike for the controllers as well as the brake.

The flange of the outer casting 40 forms a channel 165 having bores 165' through which plugs 129 extend and are firmly mounted, same having a bore in which a plunger is inserted for endwise sliding motion and is bearing against the outer end of plunger 121, against which it exerts a light and adjustable spring pressure by spring 131 and adjustable bushing 130′ through which the shank 130 passes, and when the parts are adjusted, they are held in position by the set screw 132. The spring pressure of these said parts is transmitted to the brake armature by the vibrators 120.

The armatures 55, 56 and 57 are all alike in their specific construction except certain grooves 228 cut into the brake armature 57 (see Fig. 23). These vary in their respective angles so they will keep the friction surface clean and smooth and still increase the gripping ability to said somewhat resilient surface 74, preferably made of cork. The controller armatures 55 and 56 are alike, and have a slight spiral groove cut into the one lying against the friction surface 74, (see Fig. 22) and running in the direction of arrow 55′, which will keep said surface clean by carrying dust, etc., outward in said spiral groove while at the same time increasing the gripping action against friction surface 74, thereby giving greater power to push the cutting tool into steel or other hard material.

The outer armature 75 is made up of sections of easily magnetized sheet iron on which the heels 85′ of the vibrators rest and through which the horseshoe magnets complete their circuit of magnetic flux by passing through both armatures, then through the vibrators and drawing them inward to said iron sections. These are separated by non-magnetic metal sections 76, preferably die cast right on said iron sections, and providing lugs 77′ through which pins 77 pass in sliding fit to carry said armature 75 on the vibrator ring 78 or 78′ and keep it turning with the controller, but in constant original alignment with the horseshoe magnets as shown in Figs. 11, 24 and 25. It will further be noted that the inner bearing side of armature 75 is lined with a thin layer of friction fiber 75′ so it will not have a metal to metal contact with the inner armature 55. The armatures have, furthermore, slots 229 at their inner side for the purpose of breaking the magnetic field, thus giving a more powerful grip to the magnets by intensifying the flow of the magnetic flux, concentrating same to smaller local sections.

Figure 13:
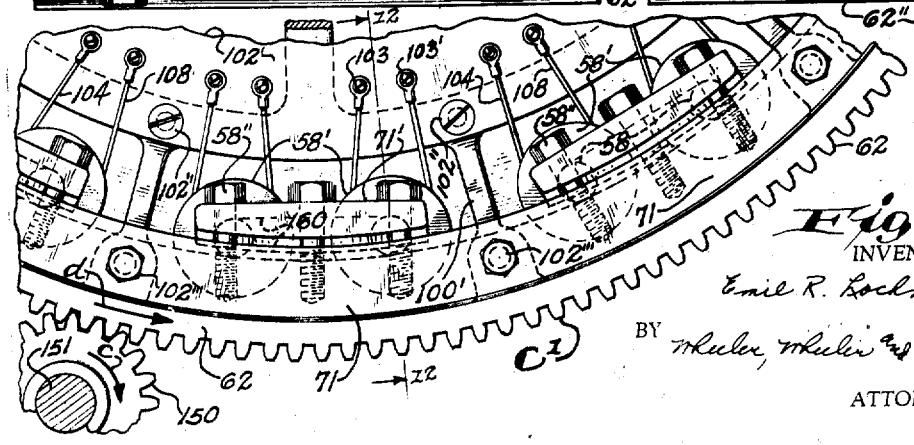
Figure 13 is a rear view of a section of a controller showing the mounting of the magnets with their respective coils and the connection of their respective leads.
Figure 14:
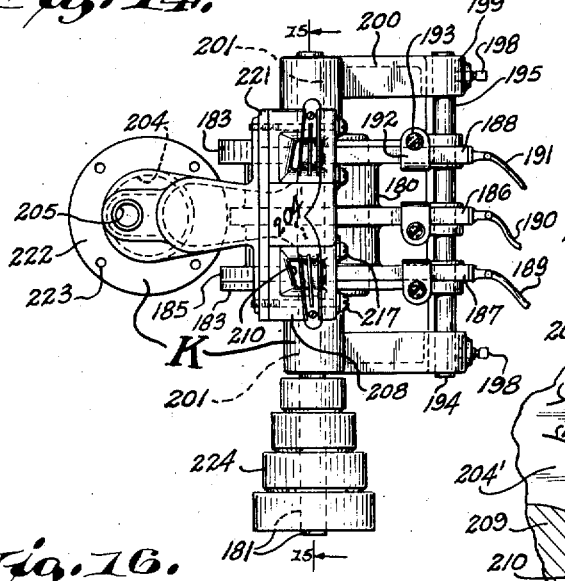
Figure 14 is a plan view of the current breaker, showing the double air channels leading across the two current breaker disks.
Figure 15:
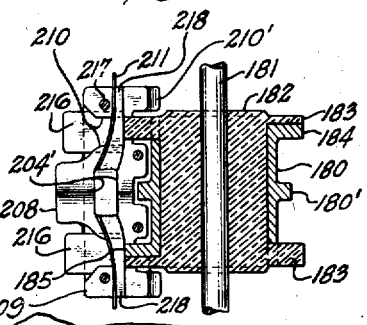
Figure 15 is a vertical cross section in line 15—15 of Figure 14, showing the metal sections and the insulation sections of the current breaker body and the two air channels leading across the two breaker disks.
Figure 16:
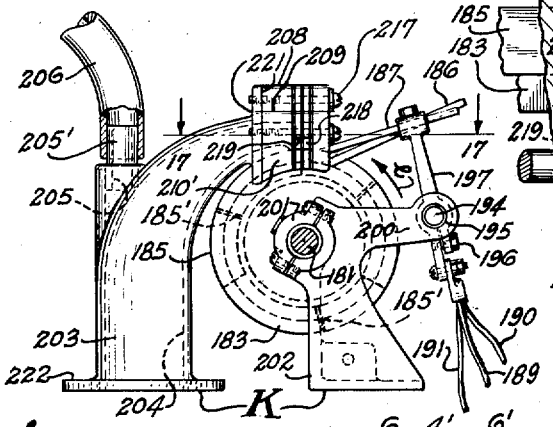
Figure 16 is a side view of the current breaker, showing the air supply unit and the breaker unit in working position, with the brushes and respective wire leads.

The mounting and adjusting of the magnets in the controllers will now be described. The body of the controller 100 has two outer rims, which are connected with a number of ribs 100′ equal in number with the magnets to be inserted (see Fig. 10) so the present controller C1 has 10 ribs, thus providing ten equal spaces for inserting horseshoe magnets 58 into the holes 88 bored through the non-magnetic metal ring 73. The wire coils 58′ are passed over the respective shanks of the wire core of the magnet. The rear part of the wire core is held in the crescent-shaped groove 160 of block 71′. Both of said parts are then firmly mounted to the mounting ring 71 by screws 58″, the gear rimmed nut 62 forming a large nut fitting the thread 71″ of the mounting ring 71 and screwed onto it. Then the entire unit with the magnets in place is set into the position shown in Figs. 11, 12 and 13, so that the magnet cores leave a very slight gap 55′ (see Fig. 24). There is no metal to metal contact between said wire core ends and the armature 55. The parts are then locked by the cap screws 102 firmly to the controller body 100. It will be noted that with the entire assembly in place, the vibrators hold the armatures against the friction surface 74 under a slight yielding pressure by springs 86 passed over and mounted on stubs 87 of holders 81 for individual adjustment. Springs 92 (see Figs. 25 and 27) are provided for adjusting the entire series, whereby said vibrators are further held from excessive swinging between the flanges of slot 96 (see Fig. 24).

Figure 8:
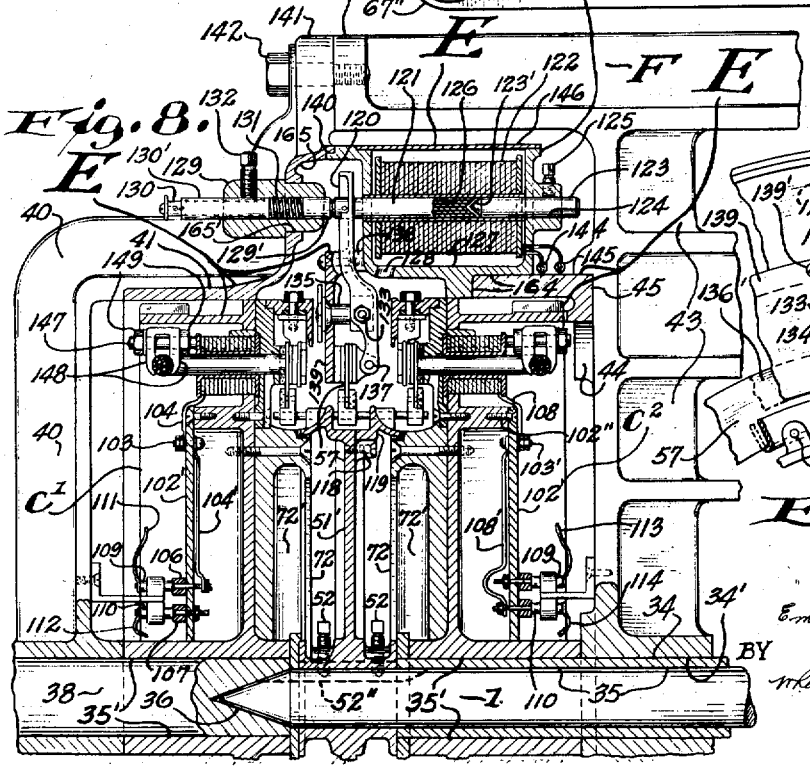
Figure 8 is like Figure 7, showing a modified electric brake, with its ring-like form fitting over, and being located outside of the control casing 45, and showing the upper part of the supporting frame F in which said parts are operatively mounted.

For the electric connections of the controllers a heavy disk of insulation material 102′ is mounted to the inner ribs 102 by screws 102″ (see Fig. 13) to which the leads 104—108 of coils 50′ are secured by the small screw bolts 103—103′ to which the inner leads 104′—108′ are attached, which connect the collector rings 106—107 and brushes 109—110 with wire leads 111, 112, 113 and 114 to which the power is supplied. The covers 72 are mounted on the inner face of the controller and same have a deep groove 72′ for catching any oil or waste lubrication, so that the friction surfaces and armatures are kept completely dry and clean. The brush holders 115—116 are mounted in their respective places against either side of the frame F so the controllers may be inserted or taken out without interfering with the brushes or power wires. In Fig. 8 certain clamps 148 are shown passed over screw threaded studs 147 and held in adjusted positions of the magnets which they grip by nuts 149, for individual adjustment of said magnets. The outer magnet C1 is inserted by opening the outer frame part 40 and inserting the entire assembly of said controller including the armature 55, passing the hub bearing 35′ onto the stub shaft 38, then closing said frame part 40 which at the same time brings the said armature 55 with its teeth 54 in contact with teeth 53 of the transmitter 51, the cap screws 142 keeping said outer frame part in locked position.

The controllers are driven in opposite directions (see Figs. 1, 3 and 13) by pinion 150 mounted on shaft 151, to which gears 152—153 are connected and running in opposite directions as shown by arrows *a—b*, said shaft 151 being driven by pulley 154 and belt 156 in bearing bracket 158 mounted on frame F (see Fig. 1) and connecting to pulley 155 mounted on shaft 157 running in bearings 462—462′ and having pulley 159 (see Fig. 3) to which cross belt may be applied for running the controllers in opposite directions.

It will further be noted that the main body of the controller 100 is of cast iron but all the metal parts surrounding the magnets are of non-magnetic metal, this including mounting ring 71, block 71′, ring 73, the vibrator ring 78 and the vibrator hinges 91, so that the magnetic flux is concentrated to the thin armatures and the vibrators, thereby giving these parts the greatest possible magnetic attraction which the rapidly interrupted direct electric current can produce.

The tool carriage (Figs. 18, 19 and 1) is mounted for easy sliding motion in straight lengthwise extending ballbearing slides in bars 475 having ball grooves 173—174 in which balls 166 are inserted and are held in position by the spacers 167, which have an extension 168 striking stops 169 set for a certain distance of travel and clamped against the bar 171 mounted parallel with the bearing bars 475 by cap screws 171′ but leaving a slot for the thumbscrews 170—170 for sliding adjustment for said stops 169. As the tool carriage usually moves only a limited distance back and forth, the ball spacers are set according to said working position. The main bearing bars 475 are mounted on the respective beams 469—470 with screws 172 in parallel alignment with the tool carriage. However, the lugs 471—472 are provided with set screws 473—474 (see Fig. 3) to keep said bearing bars 475 in perfect alignment and the ball bearings without any lost motion so that tracer 230 and cutting tool 179 will do perfect work. It will be noted that the spindle casing R is set above a strong rib 175 of the tool carriage, and same carries the steel ball race lining 173 giving strong anti-friction support to the spindle 177 and cutting tool 179 even under heavy side thrust when cutting steel or other hard materials. My ball race device for straight slides greatly increases the efficiency of machines of this type, and is of very important use for easy slide motions of heavy work supports.

The current breaker K will now be described (see Figs. 14, 15, 16 and 17). The outer sleeve 180 of suitable bronze has the solid supply flange 180', while the breaker disks 184—185 at either end have each three equally divided cut-out sections, which, like the core 182, are filled out with a suitable insulation material such as Bakelite, preferably formed in a solid mass with the bronze outer sleeve 180 mounting and insulating said unit on the shaft 181 running in bearings 201 of bracket 202 having arms 200 in which the bar 194 insulated by the fiber tubing 195, is solidly held in the bored-out lugs 199 by set screws 198.

Brush holders and brushes 186, 187 and 188, each pair forming one unit and being numbered as units, each have an upward extending arm 197 to which the brush is held in adjustable position by clamp 192 and screw 193, and said units are held in proper position by clamping same to the insulated bar 194 by screws 196. The breaker disks 184—185 have insulating disks 183 extending to the outside thereof to aid in cutting the arc. The breaker disk 184 has longer metal sections and supplies its interrupted current to the controllers by way of the tracing wire 290 of the tracer T, while the breaker disk 185 has shorter metal sections and supplies its interrupted current to the brake S, and to the coil 273 of the stop magnet 272 of the tracer T.

These metal breaker sections of said two breaker disks are spaced alternately so when the controller side 184 is on, the brake side 185 is off and vice versa. Thereby the current breaker automatically applies a brake action after each control action to the control set E as well as to the tracer T, resulting in fast and smooth tracing and cutting action of the machine.

Figure 17:
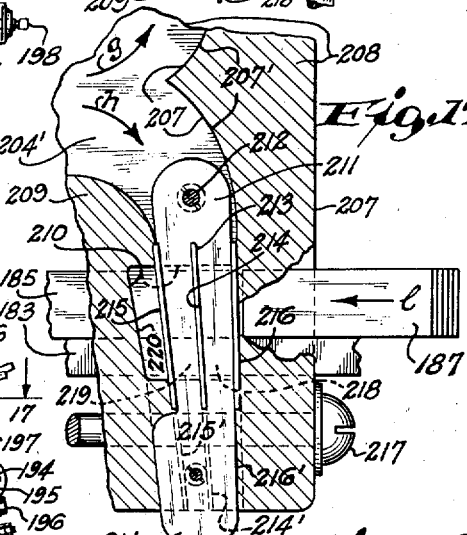
Figure 17 is a cross section on line 17—17 of Figure 16, showing a full size detail of an air channel leading across a breaker disk and showing the mica partitions and lining in front of the brush.

Using 220 volt direct electric current passing through the current breaker, the sparking between the breaker sections and the brush is excessive. Therefore a very strong current of air is used to cut off said spark as follows: The air pipe 203 has a flange 222 and is mounted by suitable bolts on the table B' as shown in Figs. 1, 3, 14 and 15, so that certain air nozzles 218—219 are located centrally above and leading across each of said breaker disks. Said air current is accelerated by reducing it from a 2" pipe to two ¼" x ½" flat nozzles which are again subdivided each in two separate ¼ x ¼" nozzles by the mica partition 213 which, with two side partitions 215 and 216 and a top sheet 211 having a slot 214 fastened with screws 212 into the reducing channel 204' of insulating block 208, form a perfect mica lining for said nozzles having slots 214', 215' and 216' into which said mica partitions are inserted, set down to the surface of the breaker disc and clamped in said position by screws 217 (see full size detail view Fig. 17 showing one of said nozzles with the current flowing in the direction of arrow 1 and the breaker disk running in the same direction, while the air is flowing in the direction of arrows *g—h*). The block 208 has reduced sections 209 into which openings 210 are cut, for clear observation of the spark cutting action of the air currents flowing through said nozzles, leaving a third open section 220 for the same purpose. A small section of mica 185' is formed at the three ends of the metal sections into each breaker disk to prevent the arc from burning the insulation at these points. The arc is the hottest when said respective metal sections leave the brush, and the arc is blown out by the strong air currents forced through said nozzles 218—219. While each breaker disk has three equally divided metal sections, these sections are longer in the control disk 184, and about one third shorter in the brake disk 185, thus giving the controller magnets 58—59 a longer, and the brake magnets 60 (see Fig. 7) a shorter time to act on their respective armatures, resulting in fast and accurate tracing and cutting action of the machine.

The air pipe 203 turns and tapers in its upper right angle turn, and forms into a right angular shape, of which the reducing channel 204' of block 208 forms the continuation. The upper end of said air pipe forms into the straight flange 221, having the outline of block 208, and on which said block is mounted by screws 217, which also hold the cover 207 having an inward curved section 207' covering and leading the air stream in the opposite directions of arrows *g—h* (see Fig. 17). Said block 208 has downwardly extending sections 210' overhanging the sides of said breaker disks and forming the bottom of said air nozzles 218—219. Said air pipe 203 has another pipe 205 leading off in an upward direction, and the tracer tube 206 preferably of rubber is attached to the nipple 205' while the other end of said tube is attached to the nipple 297 of tracer T (see Figs. 1 and 21), and the upper loop of it is supported by the hook 206'.

The current breaker K has a step cone 224 matching with the step cone 225 on shaft 151, and is driven at various speeds according to the respective work by belt 226, preferably at 60 breaks per second.

The tracer T (see Figs. 1, 3, 20 and 21) will now be described. The tracer point 230 is of various forms according to the size and shape of the cutter, but the one shown is a certain standard shape and used extensively for various kinds of work. Said tracer point 230 follows the pattern, while all the other apparatus forms a guiding and control device for operating the control set E, which in turn controls the forward and rearward motions of the tracer and cutting tool, with the object of using a plaster, wood, or other inexpensive pattern against which the tracer operates with a light pressure of about one half pound to one pound, while at the same time the cutting tool operates with from 100 to 200 pounds of pressure for cutting into hard steel, etc., which pressure varies according to the size and gearing of the control set E to the tool carriage.

The bored and tapped end 231 of the tracer 230 fits to the screw 232 of the tracer bar 240 and is screwed tight against shoulder 232'. The universal action of the tracer 230 to operate the contact 283 is caused by the ball 233 and socket joint 235' of chuck 235 seated tight against shoulder 238 of barrel 268 and bushing 239, but leaving a small gap between the shoulders 233'—239' of said parts for a slight end motion of said tracer for operating said contact 283.

A hole in the wall of chuck 235 through which a small screw 234 is passed and set into the ball 233, is for the purpose of keeping the shank 240 from turning when tracers are screwed on and off said shank. However, clearance is provided for said screw 234 as well as for the shoulder 231' to allow for free action for said universal joint. The hard steel bushing 239 is fitted and screwed tight into the barrel 268 by its screw threaded end 252. The finished bore 248 receives two steel balls 249 which are seated into the countersinks 247—250 of the shank 240 and the plunger 251 having a coil spring 253 pressing against the shoulder of said plunger and being stripped over the plunger rod 254 with its pointed top end seated in the cone socket 255 of adjusting screw 256, held by its nut in its adjusted position. While one of said balls 249 is sufficient to connect the respective parts for operating the controller contacts 284—285, the resiliency of two hardened steel balls 249 against each other and co-acting with the tracer point 230 forms a distinct improvement in sensitive tracing action of the machine. The outer end of spring 253 bears against the clip 263 having a slot for adjusting the pressure of said spring and held in proper adjusted position by screw 264.

The contact frame 265 operating on the pivot 266 has the angle 258 operating on pivot 257 with its outer free shank against the lining 259 on the inner side of said open contact frame, while opposite thereto the adjustable spring 483 held in the bore of adjusting screw 482 bears against said frame, said screw being held by the screw threaded lug 484 for pressing the frame and contact 283 over against contact 284 connecting with controller C1. At the same time magnet 279 is energized by the same current from the controller disk 184 and draws said contacts tight for positive controller action, which again is relieved periodically by magnet 272 drawing the ball 270 in its cone socket, thereby holding the contact 283 neutral between the controller contacts 284—285, thus causing a brake action between each controller action, for accurate tracing action of the machine.

When the pattern in its feed motion strikes the tracer, then the contact 283 is pushed over to control contact 285 connecting to the from work controller C2 and the tracer and tool are drawn away from the pattern. It will be noted that these vibrating actions of the tracer contacts follow each other 60 times a second, causing fast and accurate tracing and cutting action of the machine, of which the only mechanical action is caused by the striking of the pattern 405 against the tracer 230, while all other actions of the tracer are caused automatically by the automatic distribution of the rapidly interrupted direct electric current, coming from the current breaker, and going into the combination circuits of the controllers C1—C2 combined with magnet 279, and into the brake circuit S combined with the neutralizing magnet 272.

These actions of the respective controllers and the brake are greatly intensified by the actions of the vibrators, also caused by said interrupted current. Said angle 258 operates on pivot 257 held by adjustable block 260 by screws 261. Said block may be adjusted in threaded holes 262, and a longer free shank angle 258'' shown in dotted lines may be used, for finer action, with less side motion of the tracer point. Thus the tracer T may be readily adjusted for various classes of work, while the alignment of the contact frame 265 and the respective contacts remains the same.

The drawings show an excessive gap between said contacts for easy reading of the drawings, while in actual practise these contacts are set less than 1/64 of an inch apart. The spark being killed at the current breaker, no sparking takes place at the changing or operating between the contacts, which is another great advantage of my system of using said interrupted current. The closer the contacts can be set, the less motion is required of the tracer point for operating same and the more accurate the pattern will be copied. The entire tracer casing as well as the contact frame 265 are made of a light weight aluminum casting, and a hardened and ground bushing 269 is inserted for a sliding fit of ball 270 which, by being drawn into its cone-shaped socket 271 of magnet 272, holds the contact 283 central and out of contact with said other contacts as shown in Figs. 20–21 when the brake acts to keep the tool carriage from moving, which action takes place 60 times a second, and continuously keeps said position when cutting and tracing a straight surface.

It will be understood that continuous movements of the tracer, such as by the described vibrating means, are of utmost importance in increasing the sensitivity and accuracy of copying, both of which depend upon relative movement of the tracer parts between positions effective respectively for forward or in movement of the tracer toward the pattern, and for interrupting such forward movement. If the tracer parts are permitted to come to rest between the control movements thereof the various pivots and other friction surfaces involved become subject to the friction of rest, or static friction, which is not only high as compared to the friction of a body already in motion, but is also variable according to variations in, for example, temperature, lubrication, the condition and fit of the surfaces, etc. In the present device there is no static friction by reason of the vibration and the continuously moving tracer points are operative under the control of the pattern with very much less pressure, and the pressure required does not vary, remaining substantially constant under wide differences of operation conditions such as just mentioned. However, such continuous motion of tracer electric contacts might give rise to increase of sparking or arcing between the contacts. This is avoided in the present device by the use of divided or intermittent current applied as herein described in such manner that no voltage differential exists between the tracer contacts at any time when the vibrating mechanism opens the contacts.

The tracer T, on account of its co-acting magnets automatically vibrating its contacts, except when the mechanical action of the moving pattern striking the tracer is operating same, or when the tracer being away from the pattern, is operated by spring 483, which of course is always acting to push contact 283 over to contact 284, but is constantly assisted therein by magnet 279 attracting the small armatures 278, but always leaving an air gap. Said magnet is rigidly mounted on the casing by the grooved block 282 and screws 281, and the front by the clip 280' and its screws holding the coils 280 in place, while its respective leads 276—277 are connected as shown in Fig. 28, which further illustrates the action of the tracer parts and the insulation of its contacts.

The tracer T has a chamber 296 for receiving coil 273, and suitable wiring for its various electric connections. A bottom 309, preferably of insulating material, is fastened by screws 310, and a transparent cover 304 is held in frame 303 by clips 305 and screws 306, said frame being removably held by groove 302, fitting over ledge 301, and a loop 307 fitting over flange 308 (see Figs. 20 and 21) holds the lower end in place. This cover is curved, so water or cutting fluids may flow off which are used for flushing the tool for cutting or grinding operations, and to keep sprays of such fluids from striking the contacts of the tracer. The tracer contacts are cooled and kept clean, by the screened air led through flexible tube 206 and cylindrical chamber 300 through slots 299 to said contacts.

A counterbalancing device is used for balancing the overweight of large and heavy tracer points against the weight of the shank 240, using the universal joint as a fulcrum. The sliding pin 241 has its inner end resting on shank 240 while its outer end is held by lever 242, pin 243, adjusting screw 244, and spring 246 for balancing, indicated by tongues 245—245'.

The wiring diagram (Fig. 28) will now be described in connection with some tracer details and connections. The frame 205 has a bore 267 through which the plunger rod 254 passes, and operates on pivot 266, the angle 258 thereby pushing the tracing contact 283 over to the (from work) contact 285 connecting by wire 113 to the (from work) controller C2, thereby pulling the tool carriage with tracer and cutting tool away from pattern and work, until the pressure of the pattern 405 against the tracer 230 is released. Then the tracing contact is again pushed over to the (to work) contact 284 connected by wire 111 to the (to work) controller C1 which in turn pushes the tool carriage with tracer and cutting tool toward pattern and work. These actions take place at the rapid rate of 60 times a second and are interspersed with 60 brake actions a second. These brake actions are always effective on said brake S, but not on the tracing contact 283, because the pressure of the pattern against the tracer may be greater than the pull of the magnet 272 pulling the ball 270 into its cone socket 271 and thereby neutralizing the pressure of the tracing contact 283 when the pressure of the pattern against the tracer is released, as when the surface of the pattern is straight or has very little pitch.

The power line wires 314—315 with control switch 317 are usually located on the general switchboard of the machine and supply 220 volt direct electric current by wire 190 to the brush 186 and supply flange 180' of current breaker K. Thence the rapidly interrupted current is led off the breaker disk 184 and brush 188 and wire 191 to tracing wire 290, leading to the tracing contact 283 being pushed over to the (to work) contact 284 by spring 483, and connecting with wire 111 to the (to work) controller C1, which completes the circuit to its magnets by the direct wire 112 connecting with the direct line wire 314. When the tracing contact 283 is pushed by the contact of the pattern to the tracer as stated to the (to work) contact 285 connected by wire 113 to (from work) controller C2 the circuit is completed by direct wire 114 to direct line 314.

The brake circuit of rapidly interrupted current leads off from breaker disk 185, by brush 187 and wires 189 and 145 to brake S and operates its magnets by completing the circuit to direct line 314, by wire 144. The magnet 272 of tracer T operating in conjunction with the brake S, leads off from the brake current by wire 275 to its coil 273 and completes the circuit by wire 274 to the direct line 314. The magnet 279 of tracer T operating in conjunction with the controllers C1—C2 leads off by wire 277, connecting to coils 280 in parallel, and completing the circuit by leads and wire 276 to direct line wire 314.

From work contact 285 is yieldingly connected to contacts 286—286' by insulation plug 285' sliding through the bore of contact 286', but held by pressure of spring 289 passed over shank 289', and held in tension by clip 292 held in adjusted position by screw 292'.

A separate circuit of the interrupted current from the breaker disk 184 is connected by wire 312 to contact 286' and thence by wire 313, shank 289' and wire 316 to solenoid coil 336, operating the pressure bar 328 by magnet 334, and completing its circuit by wire 318 leading to the direct wire 314. This circuit is for the purpose of stopping the work support long enough to let the tracer have time to extract itself from a very deep and comparatively straight up section of the pattern, by opening said normally closed contacts 286—286', thus releasing the pull of magnet 334 and the pressure on bar 328, which operates the friction drive D for the work support W.

Figs. 29 and 30 show a modified form of drive D for the work support W comprising a driving magnet 344 running like a loose pulley on shaft 353 of bearing bracket 357 having end bearings for said shaft 345—349, said bearing bracket oscillating on pivot 358 operated by bar 329, thus engaging either friction wheels 351 or 352 driving the work support in one direction or reversing it to the opposite direction. In either case the circuit of wires 313—346 stays closed and the coil 356 operates the magnet 344 by means of brushes and collector rings 313'—346'. The circuit of magnetic flux extends through either one friction pulley 351 or the other 352, as shown by arrows *g*—*h*. However, if said drive is used by closing the switches 347—348, then the solenoid 336 is not needed and is disconnected. The belt 359 is the same as used in the drive D shown in Figs. 1, 2, 3 and 4.

The variable speed drive D (see said above figures) for driving the work support W is mounted on the platform 360 and has the function to drive said work support in the greatest variety of speeds varying according to cutting or grinding operations and the various materials to be worked; it must reverse quickly, and stop when the tracer reaches a deep place to give time to release the tracer while the cutter keeps on cutting the material. The bearing bracket 370 is movably supported by said platform 360, to which it is held in pivotal sliding position by bolts 364 passing through slots 365 and turning on pivot 358 passing through a reinforced section, forming the welding joint of bar 329 to the supporting plate 360' in which bolts 364 are firmly mounted for coupling bearing bracket 370 in sliding position with said supporting plate 360' and pushing bar 329 into the respective positions shown in dotted lines in Fig. 4, about the pivot 358, which is firmly screwed in the supporting platform 360 having circular slots 365 in which said bracket 370 moves in the direction of arrows 365′, thereby bringing the friction disk 355 in contact with friction wheel 351 and moving the work table 408 in the direction of arrow 3 (see Fig. 3) while the hand lever 410 is in dotted position 410″. When pushed over to dotted position 410′, the friction disk 355 engages the friction wheel 352, and the work table 408 moves in the direction of arrow 4. Said friction wheels are covered with a suitable friction surface 351′ (see Figs. 2, 29 and 30). The motor 363 may be driven with any suitable current, the small sheave 362 driving pulley 361 keyed to shaft 361′ and driving friction disk 355 also keyed thereto, and always running in the same direction.

The motor 440 shown in Fig. 5 is a modification of motor 363 and has a loose pulley 416 combined with a disk armature, and driven by magnet 419 tight on the motor shaft, whose coil is connected by suitable collector rings and brushes to leads 312—313 and to wires 313—314. The said motor takes the place of solenoid 336 for stopping the work table 408 when the tracer is in a deep depression as stated. The friction disks 351—352 are splined to shaft 350 and are jointly adjustable thereon by the right and left handed screw 368 (see Fig. 1). Matching right and left handed tapped sleeves ,of guides 366—367 guide said friction wheels jointly along the shaft 350 inwardly for slower speeds and outwardly for faster speeds by turning crank handle 369 in either one direction or reverse thereto, thus being able to make very fine adjustments of feeding speed for the work table 408. The shaft 350 has bearing brackets 373 in which it runs, and the sleeve 371 is mounted thereto to drive sheave 380 by belt 372. The sleeve 381 running on stub shaft 385 has the sheaves 380—382 and 383′ in unison therewith.

The table 408 has end bearings 395 in which the lead screw 393 runs, and is pulling the said table by leading through the stationary nut 396 in opposite directions by the bevel gear and pinion connection housed in casing 390, the bevel pinion being driven by the double sheave 382′—383 and the belt 289. The yoke 374 has suitable bearings pivotally connecting it to both ends of shaft 350 with the outer part of the yoke terminating into a flat bracket, supporting bearing 376 in sliding adjustment against the edge 375 in slots 378 and being held in adjusted position for tightening belt 372 by bolts 379. An adjustable link 386—387 connects with its end bearings the stub shaft 385 and a shoulder turned on casing 390 as shown in Figs. 1 and 3, and is set for tightening belt 289 by bolts 388 operating in suitable slots in said link sections. Said link in combination with yoke 374 also guides the said two belts in the up and down and in and out motions of the work support W and table 408. The pedestal 429 has sides 428 and beveled slides 427 on which the crosshead 430 is slidably retained by the beveled guides 426 in very accurate adjusted position by screw bolts 424 passing through suitable bores in lugs 423 and held in said adjusted position by check nuts 425 (see Figs. 1 and 3). The weight of the work support W is counterbalanced by weight 435 having a yoke 434 for attaching wire ropes 431 leading over rope sheaves 432—433 turning on studs 432′—433′ with its free ends being fastened by eye bolts 430′ to the crosshead 430. A cover 392″ is provided to make gear casing 390 dustproof.

The work support W described above, has a vertical groove 429′ for passing the nut 399 (see Fig. 3), and on which it is fed up and down on the pedestal 429 by actuating mechanism comprising lead screw 398 having bearings 398′ at its upper and lower ends, a sprocket 399′ attached to the screw, and a sprocket chain 400 leading to sprocket 401 mounted on spindle 402 in adjustable bracket 404 for tightening said sprocket chain. The crank handle 403 having the usual square socket is passed over the upper extending square stub of spindle 402 for operating the work support up and down said pedestal 429 with a gradual feeding motion at the end of each cut when the table 408 is being reversed by the drive D. A suitable automatic feeding device (not shown) is inserted in the base and attached to the lower end of said lead screw 398, operating in conjunction with reversing bar 328 attached to hand lever 410 by pivot 415. When said lever is moved in base B upon pivot 409, it cooperates with a semi-circular plate 412 having a stop notch 413 receiving the nose of the sliding bolt 411 to hold the lever in a neutral position in which the work table 408 stands still, since the constantly running friction disk 355 is then held out of engagement with said friction disks 351—352.

The reversing bar 328 (see Fig. 4) being held in said neutral position, the roller 331 of lever 333 operating on pivot 335 is held at the point 330′ of the triangular shaped lock 330 welded to reversing bar 328, and the dotted position 330′ shows said bar and lock moved forward and the roller 331 turning on pivot 332 in position for locking the reversing bar 328, thereby holding the running friction disk 355 in contact with friction disk 352 and moving the work table 408 in the direction of arrow 3, while in reversed direction of said bar and lock as shown in dotted position 330″ the table 408 moves in the direction of arrow 4. However, the solenoid 336, together with spring 338, supplies a flexible yielding pressure to said lock 330 by their combined pull on extension 340 by plunger 341 attached thereto by pivot 341′, all operating on pivot 339 suitably attached to the base of the machine. Said solenoid 336 is pivotally mounted thereto and held in position by casing 337. While the spring 338 keeps the related parts in position, the solenoid, by means of the current connection flowing through the customary closed contacts 286—286′ of the tracer T, supplies the required pull against the respective bevel face of lock 330 to feed the table 408 as described. However, if the tracer strikes a deep spot in the pattern and the pressure of the pattern against the tracer 230 becomes excessive, then contact 285 yields and thereby opens the contacts 286—286′, thus slowing up or stopping said table 408. The tapering sides of lock 330 accommodate the differing angle of contact of the friction disk 355 to friction disks 351—352 as they are nearer to the center of friction disk 355 when that angle is greater, or if they are further out, when that angle is lesser, the position of the small roller against said tapering sides of lock 330 varies, but maintains a constant pressure for the friction contact of said friction disks.

The motor 440 (see Fig. 5) is a modification for accomplishing the same purpose by stopping the motor pulley 416 while the motor keeps on running. Also, the modification shown in Figs. 29 and 30 accomplishes the same result by releasing the magnet 344 for driving the friction disk 355. All other functions of said modified forms remain the same as in drive D.

An automatic reversing device for driving the table 408 has the upright feeding shaft 476 with a dog 477 splined thereto for up and down motion on said shaft, while its free end is operated by the adjustable dogs 478 mounted with screws on the upper edge of the table 408, said feeding shaft being held in suitable lugs on the pedestal 429 and crosshead 430. Below the table B′ said shaft operates the reversing bar 328 by the dog 479 striking pins 480. A modification thereto is shown in Fig. 6, showing an automatic operation of the reversing bar 328 by two solenoid magnets 325—326 operating the respective plungers 325′—326′ mounted on lug 327 of reversing bar 328, which is again shown in neutral position, as in Fig. 3. The leads 319 jointly connect to wire 315 and the leads 321—322 lead by way of the reversing switch 323, to solenoid 325 as shown, moving the reversing bar in the direction of arrow K. When the dogs 478 throw the reversing switch, aided by spring 324, the table 408 will move in the opposite direction (see wiring diagram Fig. 28).

The base B is divided into two principal sections, being divided by the reinforced partition wall 448, which is bearing the weight of the upper construction by supporting the table B′ and is making the front section of said base a separated dustproof chamber having outer intake screen 436 covered with suitable dustproof fabric 438 separating the coarse dust. An inner second screening cloth 422 is drawn over steel rods 441 inserted into suitable holes in sections of the side walls of said base B, thus forming an inner dustproof chamber 444, having an outlet 445, from which the air pipe 446 leads to the intake 456 of fan 460. The motor 450 has pulley 453 connected to the fan pulley 455 by belt 454 running in the direction of arrow *w*, sucking the air through said screen 442 and screen sections 443, the screened air leading in the direction of arrows *j*, and the arrows *r* and *v* leading from said fan in pipes 457 into the control set E for cooling the same, and through pipe 458 to the current breaker K and the tracer T by means of flexible tube 206. Said motor 450 has a second pulley 452 connected to pulley 459 of drive shaft 157 by belt 463 leading in the direction of arrow *u*. A step cone 225 mounted on said shaft is connected to step cone 224 by belt 226 for driving the current breaker K in the direction of arrow *l*. The motor 450, fan 460, and connected accessories are mounted in chamber 449 of base B and is closed in by dustproof sheathing 447 (see Fig. 1). A small chamber 467 is provided above said table B′, having a cover 465 with passage 465′ for the flexible tracer cable 464 passing therethrough and forming the loop 466, allowing for various settings of the tracer and for blocking it up on the tool carriage when long and narrow pieces of pattern and stock are set above each other on said table 408, when said loop is pulled out to reach said higher position of the tracer. A wiring panel 467′ is provided receiving all of the tracer wiring from the tracer cable 464 on suitable wiring posts and leading from there to the current breaker, controllers, brake, etc., as specified in Fig. 28.

An important feature in the construction of the controllers C1 and C2 is the use of a series of small magnets set in ring-like form, near the outer rim of said controllers, so that said controllers may readily be made more powerful by simply increasing their diameter and adding the required number of additional small magnets thereto. Likewise, said controllers can readily be made smaller by using only about three or four of said magnets, when the controllers are used with different gearing for controlling the tracer and tool by means of a lead screw, while in either case their efficiency remains the same. The small coils 58′ are inexpensive and easily replaced or exchanged for weaker or stronger ones, according to the particular uses for different machines. The brake S being of very similar construction, and using the same small magnets, can be changed in size in like fashion, so that said control sets E can be made for any size machine and any purpose without fundamental changes. When a very small control set is used, the transmitter 51 is replaced by a long pinion, preferably of one piece with the control shaft 1.

The modifications shown and described are for the purpose of alternate use for various materials and working conditions on the same machine, and do not change the nature or principles of my invention.

The electric control system herein disclosed is useful wherever a minutely accurate control is required to be achieved electrically from a remote point. In an electrical steering gear in floor leveling devices, for elevators, and in many other pieces of apparatus, there is a tendency for the device which is being operated to overrun the electrical control. In the present invention in which the use of a brake alternates so rapidly with the use of the feed, it is almost impossible for the actuated device to overrun. There is another advantage in that the frequent interruption of the current by the rotary switch relieves the control switch of all tendency to arc, thus eliminating relays and the like.

The general arrangement by which the tool is driven at a variety of speeds without loading the carriage is important to the sensitive and delicate operation of a device of this character. It will be noted that several speeds are provided between the driving motor 30 and the countershaft 22, and additional driving speeds are provided between the countershaft and the tool spindle. Particularly, however, it is to be noted that the drive to the spindle is effective from a pulley sufficiently elongated so that no connection to the spindle is necessary other than that of the belt itself, the weight of which is carried from above.

One of the purposes of the invention is to provide for effecting maximum accuracy of controlled movement and of controlled positioning of the driven mechanism under the control of the tracer and generally to improve the construction and operation of such mechanism. In a tracing machine maximum accuracy in reproducing the form of the pattern on the work piece requires a minimum of over-all lag or response-time for starting, stopping or reversing the support or slide which carries the tracer and tool, for example. The slide should instantly follow the control of the tracer device, and to this end the control clutch mechanism is required to instantly interpret and transmit to the slide the movement of the tracer stylus, as reflected in the positioning of the tracer contacts.

One of the improvements contributing to the general purposes mentioned is to effect continuous rapid vibration of the active clutch or brake parts of the driving and braking mechanism. Among other improved results effected by the vibration is to reduce the delay or lag in control-response such as otherwise might occur through the increased friction resisting movement of parts from a position of rest.

The clutch-brake mechanism of the present disclosure provides several different vibratory effects, as follows:

Referring to Figs. 10–11, the spring pressed pivoted levers 85, which may be associated both with the driven clutches and with the brake, carry shoes 85 of material, such as soft iron, which carries some of the flux of the associated magnet cores 58 whenever the associated vibrator pressure rings 75 are magnetized for effecting friction pressure on the associated clutch or brake driven members. The springs 87 maintain a continuous relatively slight pressure of the levers on the rings and of the rings on the associated driven friction members, for purposes later mentioned, but the relationship of the parts is such that the periodic magnetizing and demagnetizing of the magnet cores by the interrupted current as has been described, which occurs continuously in the brake magnets, and occurs in the magnets of each of the forward and reverse clutches continuously during the time that the tracer has selected the clutch for driving, effects a periodic pressure vibration of the pivoted levers 85 on plates 75, and of plates 75 on the associated driven plates such as 55, whereby the effect occurs on both friction faces of the plates 55.

Figure 9:
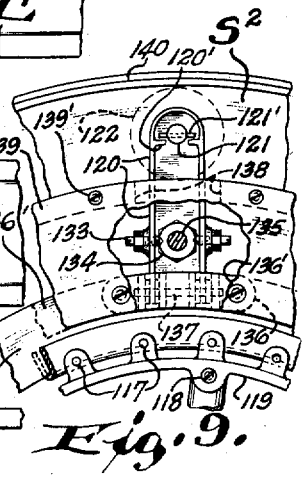
Figure 9 is a front elevation and sectional view of the electric brake shown in Figure 8, with parts broken away to show a brake vibrator and its co-related parts in operative connection.

Referring to the modified structure of Figs. 8, 9 it will be seen that in this instance also the brake is vibrated as described, but the vibrator means is modified. The springs 131 continuously relatively lightly urge the pivoted levers 120 in direction for the friction shoes 137 to set up pressure on the brake ring 57 and the continuous periodic energizing of the magnet coil 202 sets up the periodic vibration as before described.

Further, each of the structures of the modified forms respectively shown in Figs. 7, 8 provides vibration effects at all times when either of the forward or reverse clutches is activated by the tracer control mechanism. The rapid periodic energizing of either of the clutches sets up a torsional pressure vibration in all the driven parts connected for actuation of the tracer controlled support or slide. It is obvious that, as between the interconnected clutch and brake elements there exists a torsional deflection, reversed periodically by the alternate application of the driving and braking effects, previously described. Such reversal of torsion effect is transmitted to the tracer controlled slide as a vibratory force operating alternately in directions to move or stop the slide, and depending in part upon the mass of the slide and in part upon the frequency of the vibration forces, the result may be such as to effect either continuous vibratory advance movement or alternate start and stop of the slide. Also, by reason of the inertia and friction of the slide, such forces effect a torsional vibration in all of the rotation elements of the train connecting the clutch-brake device to the slide.

It will be noted that in each of the clutch-brake devices herein disclosed the opposed friction plates of each of the forward and reverse clutches and of the brake are continuously maintained in friction contact, without clearance. In the device of Figs. 10, 11 the result is effected by springs 87, and in the modified device of Fig. 8 by the springs 131. Such continuous pressure contact of the parts is important for effecting the minimum of over-all lag and response time, and also is of assistance in rendering effective the vibratory effects, particularly in the driven transmission elements and driven slide.

In each of the clutch forms the clutch or brake friction elements which are connected to the driven portion of the transmission are each located between friction plates which are relatively movable toward one another to effect friction contact on both faces of the intervening driven element, which is particularly effective both for increasing the driving or retarding capacity, as the case may be, and also where the device is to be continuously operated without clearance, in the latter instance because effective continuous contact can be maintained with considerably less pressure per unit of friction surface area.

I claim:

1. An electric control device comprising the combination with driving and driven members, of electrically energized means for controlling the transmission of motion from the driving to the driven member, a brake applicable to said member, means for automatically applying said brake intermittently to said driven member and intermittently rendering said brake inoperative thereon, and current flow controlled means for energizing said electrically energized means intermittently during the interval when the brake is inoperative.

2. An electrical control device comprising the combination with a driven member, of driving means for said member and braking means for said member, electrically energized control mechanisms for actuating said driving and braking means, electrical connections leading to the respective control mechanisms, and a current control means operatively connected for supplying current alternatively through said connections at frequent intervals, whereby to actuate said driving and braking means alternately and at frequent intervals.

3. A control device comprising driving and driven members, clutch means for connecting said members, brake means operable upon the driven member, means for intermittently operating the brake means to urge a stop of the driven member at short intervals, and mechanism for actuating the clutch means to drive the driven member from the driving member at intervening intervals.

4. A control device comprising the combination with a driven member, of forward propelling means, rearward propelling means, and braking means operable upon said member, means for continuously and automatically rendering said braking means effective at short intervals upon said member, means for rendering one of said propelling means effective upon said member in timed relation to said braking means and during the interval when said braking means is inoperative, and a control device operatively connected with said propelling means to determine which thereof shall be operative upon said member during such intervals.

5. For an electric tool control, a control device comprising stationary and moving electromagnetic elements, means for intermittently energizing one of said elements periodically at a predetermined frequency, a tracer, a tool feed device including an actuating armature in operative relation to said elements and stopped or advanced according as it is attracted by one or the other of said elements and means including electric contacts and connections controlled by said tracer for directing current to and from another of said elements.

6. The combination with a tracer and carriage, of feeding mechanism therefor including a driving part, a driven part connected with the carriage, and electromagnetic clutch effective between said parts and an electromagnetic brake means for stopping said carriage, means for intermittently energizing the brake, and means controlled by said tracer for intermittently energizing the clutch, said brake and clutch energizing means being alternatively operative.

7. For an electric tool control, a control set comprising a carriage, a tracer and tool mounted on said carriage for movement to and from pattern and work, an actuating member for said carriage, a forward driving electromagnetic clutch element, a rearward driving electromagnetic clutch element, and an electromagnetic brake element respectively adapted for control of actuation of said member, means for continuously driving said clutch elements in opposite directions, current supply means operatively connectible to energize said clutch elements and brake element alternately and intermittently at high frequency, and means actuated by said tracer for regulating the operation of some of said elements.

8. An electric tool control comprising a carriage, a tracer and cutting tool mounted on the carriage for movement therewith, oppositely moving propelling elements, a driven element, electrically controlled means for selectively coupling the driven element to either of said propelling elements, brake means intermittently effective upon said driven element, and tracer controlled means operative only in the interval of brake inaction for enabling the coupling of said driven element selectively with one of said propelling elements.

9. A control device comprising a driven member, electrical means for controlling the operation of said member including electrically controlled driving connections and electrically controlled braking connections, a circuit to said driving connections including a switch, a second circuit to said braking connections, and means for supplying a periodically interrupted current alternately to the respective circuits, whereby to energize said braking and driving connections alternately.

10. In an electric tool control, the combination with a tracer and switch means closed by the tracer upon its deflection from an intermediate position, impositive means periodically inoperative for automatically drawing said tracer toward said intermediate position, and means for intermittently applying power to said impositive means for rendering it operative.

11. In an electric tool control, the combination with a tracer, switch means closed by the tracer upon its deflection from an intermediate position, a driven member, electrically controlled driving means therefor, electrically controlled braking means therefor, and means for alternately energizing said driving and braking means, said switch controlling the energization of said driving means only, and means whereby the energization of said braking means tends to restore said tracer to said intermediate position.

12. The combination with a machine having a relatively movable work support and cutting tool, of a combined speed changer and reverser operatively connected to effect relative movement between said support and tool and comprising driving and driven shafts mounted for relative angular movement and having an intermediate relative position substantially at right angles to each other, friction disks spaced upon one of said shafts at each side of the end of the other shaft, a complementary friction disk carried by said other shaft and engageable with either of said first mentioned disks upon the occurrence of relative angular movement between said shafts, and means for adjusting said first mentioned disks to and from each other axially from the shaft upon which they are mounted.

13. The combination with a guideway comprising a pair of rails having spaced longitudinally grooved surfaces, of a slide having a portion interposed between said surfaces and provided with complementary longitudinal grooves, a set of antifriction bearings confined in the respective grooves of the slide and the rails, whereby to provide support for the longitudinal movement of said slide portion between said rails and stop means connected with said rails in the path of said bearings for limiting the movement of said bearings independently of said slide.

14. In a diesinking or copying machine, the combination with a work support, of a tool slide carrying a tracer and cutting tool and movable to and from said support, guide rails for said slide having laterally spaced longitudinal grooves, portions between which a portion of said slide has complementary grooves, balls positioned in the respective grooves of the slide and rails, spacing plates for said balls interposed between the respective rails and the slide and apertured to receive the several balls, and means adjustably limiting the movement of the respective plates, whereby to fix the range of ball movement in the several positions of the slide.

15. A device of the character described, comprising the combination with a work support and feed mechanism therefor, of a continuously operable source of power for said mechanism, disengageable means for driving said feed mechanism from said source of power, a tracer carriage movable to and from said support, a tracer and tool upon said carriage, means actuated by the tracer for regulating the movement of the carriage, and means effective upon the overloading of the tracer for disengaging said driving means to interrupt the drive to said work support.

16. In a device of the character described, the combination with a contact frame and a switch controlled in the movement of said frame, of a universally mounted tracer point, and means for actuating said frame in a switch closing direction upon the occurrence of any oscillatory movement of said tracer point, said means comprising a lever connected with the tracer point and having a socketed end, a push rod connected with the frame and having a socketed end, and at least one ball interposed between the sockets of said lever and push rod.

17. In a device of the character described, the combination with a switch and a pivoted switch actuator, of a lever adjustable along said actuator to engage different portions thereof for operating said switch with greater or less movement in proportion to the movement of said lever, a push rod engageable with said lever, a tracer point mounted for universal and yielding movement and provided with a socketed lever, and at least one ball interposed between the end of said socketed lever and said push rod.

18. In a device of the character described, the combination with a universally and yieldably mounted tracer lever, of a tracing point carried thereby, means operable by said lever for closing a switch, and means operative upon said lever for counterbalancing the weight of said point, said means comprising a post extending upwardly from said lever, a counterbalancing lever engaging said post, and means biasing said lever adjustably to oppose the weight of said point.

19. In a device of the character described, the combination with a slide, an operating shaft therefor provided with stationary bearings, and means for rotating said shaft in both directions, flexible means encircling said shaft and extending in opposite directions therefrom to said slide, and means adjustably tensioning said means with respect to said slide, whereby to eliminate lost motion and ensure accurate operation of said slide to and fro in accordance with the rotation of said shaft.

20. In an electric tracer, the combination with an apertured control member subject to displacement, of a ball in the aperture, and an electromagnet having a pole upon which the ball is movable, and means for energizing said electromagnet from time to time, whereby the attraction thereof for the ball will tend to center said control member in a predetermined position.

21. In an electric tool control, the combination with a tracer mounted for yielding movement from a predetermined central position and provided with contact means, of stationary contact means engageable by said tracer contact means upon the yielding movement of said tracer, and means operable intermittently at high frequency for restoring said tracer to said predetermined position whereby periodically to assure the separation of said contact means.

22. In a device of the character described, the combination with a tracer yieldably movable from a predetermined position and provided with contact means, of stationary contact means engageable by said tracer contact means upon the yielding of said tracer from said position, a tool and tool support mounted for movement, electrically controlled means for regulating the movement of said tool and tool support, a circuit including said electrically controlled means and said contacts, means for periodically opening said circuit, and means for automatically restoring said tracer to said predetermined position upon each interruption of said circuit.

23. In a device of the character described, a tracer biased for movement toward a predetermined position and yieldable therefrom, an electromagnet arranged to supplement the bias of said tracer toward said predetermined position, contact means closed by the movement of said tracer from said position, and circuit means for periodically energizing said electromagnet.

24. In a device of the character described, a tracer biased for movement toward a predetermined position and yieldable therefrom, an electromagnet arranged to supplement the bias of said tracer toward said predetermined position, contact means closed by the movement of said tracer from said position, and circuit means for periodically energizing said electromagnet, together with circuit means for alternately energizing said contact means, whereby the circuit to said contact means is interrupted at the time said electromagnet is energized.

25. The combination with a machine having a relatively movable work support and cutting tool, of a combined speed changer and reverser operatively connected to effect relative movement between said support and tool and comprising a driven shaft having fixed bearings, a driving shaft mounted for relative angular movement respecting said driven shaft to and from an intermediate position wherein said shafts are substantially at right angles, a friction disk upon the driving shaft, and friction disks upon the driven shaft spaced at each side of the axis of the driving shaft for engagement with the face of the friction disk carried by the driving shaft, and means connecting said driven shaft with said work support.

26. The combination with a machine having a relatively movable work support and cutting tool, of a combined speed changer and reverser operatively connected to effect relative movement between said support and tool and comprising driving and driven shafts mounted for relative angular movement and having an intermediate relative position substantially at right angles to each other, friction disks spaced upon one of the shafts at each side of the end of the other shaft, a complementary friction disk carried by said other shaft and engageable with either of the first mentioned disks upon the occurrence of relative angular movement between said shafts, means for adjusting said first mentioned disks concurrently to and from each other axially along the shaft upon which they are mounted, whereby to vary the driving relation between said shafts, means for adjusting the angularity of said shafts with respect to each other, whereby to engage one or the other of said first mentioned disks with said complementary disk, and means biasing said shaft adjusting means toward one or the other extreme of its position whereby yieldably to maintain said disks in engagement, said biasing means including a spring, a cam and a cam follower arranged for the variable tensioning of said spring according to the angular disposition of said shafts, whereby to vary the pressure engagement of said disks according to their displacement.

27. The combination with a tracer and contact points controlled thereby, of means for intermittently energizing said contact points, and electromagnetic means for urging said contact points to close, said electromagnetic means being connected to said contact energizing means, whereby to be intermittently energized concurrently with the energization of said contacts.

28. The combination with a tracer and a carriage upon which the tracer is mounted, of driving connections for said carriage including a feed clutch, means controlled by said tracer for activating said feed clutch in a predetermined position of said tracer, said clutch activating means being intermittently operable, and supplemental means connected with said activating means and intermittently energized concurrently therewith for urging said tracer periodically toward said position.

29. The combination with a tracer and a carriage controlled thereby, said tracer being provided with a mounting upon which it is yieldable between a plurality of positions thereon, of driving connections to said carriage provided with clutch and brake mechanisms, means for intermittently energizing said clutch mechanism subject to the control of said tracer, means for intermittently and alternately energizing the brake mechanism, means whereby said tracer in one of its positions effects the energization of the clutch mechanism and in another of said tracer positions precludes the operation of said clutch mechanism, and a biasing device connected with the means which intermittently energizes said clutch mechanism for drawing said tracer toward the position in which said clutch mechanism is rendered effective.

30. The combination with a tracer, a carriage and driving connections to the carriage including a clutch and brake, of means controlled by the tracer for rendering said clutch effective in one tracer position and ineffective in another, a plurality of opposing biasing devices operatively energizable to act alternately upon said tracer to assist its movement to the respective positions, and means for alternately energizing said brake and clutch and concurrently energizing the respective devices, the energization of the clutch being concurrent with the energization of the biasing device which urges the tracer toward the position in which said clutch is rendered effective.

31. The method of controlling a driveable member to prevent overrun which comprises braking said member for brief intervals and with high frequency, the synchronous application of power urging motion of said member between certain intervals of braking thereof, and the control of such power application in accordance with the desired advance of said member whereby said member is urged to advance only between certain intervals of braking and not between other intervals of braking.

32. The combination with a tracer mounted for yielding movement between two positions and means biasing said tracer for movement toward one of said positions, of a carriage operatively connected to be controlled by said tracer and provided with driving connections including a clutch and a brake, means for intermittently supplying power for the energization of said clutch, and means controlled by said tracer in its last mentioned position for rendering said power effective upon said clutch, together with means for applying said brake intermittently when said clutch is de-energized.

33. A device of the character described, comprising the combination with a work support and a cutter support, of means mounting the respective supports for relative movement to and from each other and for relative movement transversely with respect to each other, a traverse mechanism operatively connected with one of said supports for moving it transversely with respect to the other, a feed mechanism connected with one of said supports for moving it in a direction to and from the other support, a cutter operatively mounted upon the cutter support to partake of the relative transverse movement of the motion to and from the work support, a tracer operatively mounted on the cutter support and provided with control means for interrupting motion transmission through said feed mechanism, said control means comprising a first part connected with the tracer to partake of the movement thereof and a second part in the path of the first part to be engaged thereby under the influence of the tracer, a resiliently yieldable mounting for said second part, and a second control means connected with said mounting to be actuated upon the yielding thereof and provided with connections for the interruption of motion transmission through said traverse mechanism, whereby to stop the transverse relative movement of the respective supports upon the overloading of the tracer.

34. In a copying machine, the combination of a work support and a tool support, transmission mechanism for relative movement of said supports including interruptible driving clutch means and engageable and disengageable motion restraining means, and control means for said transmission mechanism including means connectible for rapidly continuously repeated alternative interruption and connection of said clutch means, a pattern controlled tracer device determinative of connection or disconnection of said connectible means, and overrun preventing means automatically operable during the tracer controlled connection of said connectible means for engaging said restraining means during the intervals of said rapidly repeated interruption of said clutch means.

35. A machine as specified in claim 34 in which said connectible means and said overrun preventing means are each electromagnetic, said machine including a source of rapidly repeated current impulses and said control means operating to supply alternate current impulses from said source respectively to said connectible means and to said overrun preventing means during said tracer controlled connection of the connectible means.

36. In a copying machine, the combination of a work support and a tool support, transmission mechanism for relative movement of said supports including an interruptible driver, and control means for said transmission including a tracer device providing elements relatively shiftable under the control of a pattern to different positions respectively effecting interruption and driving operation of said driver, and vibrator means connected for rapidly and continuously alternately urging said different positions of the elements.

37. A machine as specified in claim 36 in which said vibrator means is electromagnetic.

38. In a copying machine, the combination of a work support and a tool support, transmission mechanism for relative movement of said supports including an interruptible driver, and control means for said transmission including a tracer device providing elements relatively shiftable under the control of a pattern to different positions respectively effecting interruption and driving operation of said driver, means continuously urging said elements to said driving position thereof, and vibrator means connected for rapidly continuously alternately urging said elements to said interruption position and releasing said elements for movement to the other position.

39. In a copying machine, the combination of a work support and a tool support, transmission mechanism for relative movement of said supports including an interruptible driver, and control means for said transmission including a tracer device providing elements relatively shiftable under the control of a pattern to different positions respectively effecting interruption and driving operation of said driver, and an actuator device rapidly intermittently urging said elements to said position effecting interruption.

40. In a copying machine the combination of a tracer support and a pattern support, transmission mechanism for relative movement of said supports including a driver device energizable and deenergizable for controlling a forward direction of one of said supports toward the other, and control means for said transmission including a tracer device carried by said tracer support and providing elements movable to first and second relative positions respectively for effecting said energized and deenergized conditions of said driver device, power vibrator means rapidly alternately urging said tracer elements toward the different positions thereof, and other means for urging said second position of the tracer elements including a pattern carried by said pattern support.

41. In a copying machine the combination of a tracer support and a pattern support, transmission mechanism for relative movement of said supports including an electromagnetic driver device energizable and deenergizable for controlling a forward direction of one of said supports toward the other, and control means for said transmission including a tracer device carried by said tracer support and providing contact elements relatively movable to closed and open positions, a plurality of sources of current each providing rapidly interrupted current impulses at different times respectively, one of said sources being connected to energize said driver device in the closed position of said contact elements, and a device under the control of the current impulses from the other supply source for continuously intermittently urging said tracer contacts toward said open position whereby to separate the contacts only when they are not actuated from the driver current supply source, said transmission control means including other means for urging said contacts toward open position including a pattern carried by said pattern support.

42. In a copying machine, the combination of a work support and a tool support, transmission mechanism for relative movement of said supports including clutch means providing friction surfaces alternatively effective for driving and interruption, and control means for said transmission including a tracer device providing elements relatively movable under the control of a pattern to different positions respectively for the driving and interruption effect of said friction surfaces, and power operable vibrator means continuously rapidly intermittently urging said interrupting effect of said friction surfaces.

43. A machine as specified in claim 42 including transmission brake means providing friction surfaces operable for engagement and release thereof, and power means continuously operative to intermittently engage said brake friction surfaces whenever said vibrator means urges said interrupting effect of said clutch friction surfaces.

44. A machine as specified in claim 42 in which said vibrator means is electromagnetic, and including means providing electric impulses for said continuous rapid operation thereof.

45. In a copying machine the combination of a work support and a tool support relatively movable in a plurality of mutually transverse paths, transmission mechanism for effecting coordinated movements in said paths including reversible movement in one path and interruptible line feed movement in the other path, and control mechanism for said transmission mechanism including a tracer device providing elements relatively movable through a predetermined distance for control of said reversible movement and movable a further distance, electromagnetic means for interruption of said interruptible line feed movements, contacts normally urged to a predetermined relative position and connected for displacement therefrom upon said element movement through said further distance, and rapidly intermittent current supply means connectible to effect operation of said electromagnetic means in said displaced position of the contacts.

46. In an electrically operated tracer controlled machine tool, a source of two series of alternately occurring unidirectional electrical impulses, a tracer mechanism responsive to a pattern for controlling the operation of said machine, a cutter arranged to operate upon a work piece, means connectible to be operated by one of said series of electrical impulses and to function intermittently to urge relative movement of said cutter and work piece, means connected to be operated by the other of said series of electrical impulses and functioning intermittently to oppose said relative movement of said cutter and work piece, and means responsive to operation of said tracer mechanism to alternatively connect or disconnect said means for urging relative movement in accordance with the contour of the pattern.

47. In a tracer controlled machine tool, a tracer mechanism arranged to cooperate with a pattern to be copied, a cutter mounted for operating upon a work piece to cut it in accordance with the pattern, a magnetic clutch arranged to urge relative feeding movement between said cutter and the work piece, a magnetic brake arranged to oppose said relative movement of said cutter and work piece, a source of two alternately occurring unidirectional intermittent electric current impulses, an electrical circuit arranged to transmit one series of said intermittent current impulses to said magnetic brake, another electrical circuit arranged to transmit the other series of said intermittent current impulses to said magnetic clutch, the combined action of said currents operating to alternately energize said clutch and brake, circuit interrupting means connected in said clutch circuit, and means actuated by said tracer mechanism and connected to operate said circuit interrupting means in manner to control said clutch in accordance with the requirements of the pattern, said alternately energized clutch and brake serving to effect controlled relative feeding movements between said cutter and the work piece.

48. In a copying machine, the combination of a work support and a tool support, transmission mechanism for said supports including an interruptible driver, control means for said transmission including a tracer device providing a shiftable pattern contactor, elements relatively shiftable under the control of said contactor between different positions respectively corresponding to interruption and driving condition of said driver, and power means operative substantially continuously to effect rapidly intermittent relative movement of said elements whereby to materially reduce the frictional resistance opposing said shifting movement of said elements.

49. A copying machine as specified in claim 48, in which said power means includes electromagnetic means for said rapidly intermittent relative movement of said elements.

50. A copying machine as specified in claim 48, in which said power means comprises means for rapidly intermittent movement of said elements in opposite directions, and said machine also includes control means preventing the driving condition of said interruptible driver during the movement of said elements in one of said opposite directions.

51. The control method recited in claim 31 as modified by the use of a braking frequency of more than forty intervals per second.

52. In a copying machine, the combination of a work support member, a tool support member, power transmission mechanism for relative movement of said support members including a driver, tracer control means including a pattern and a plurality of members relatively shiftable under the control of the pattern to different positions respectively for different effects of said transmission mechanism, other power operable mechanism for rapidly vibrating one of said members between different positions of the relative movement thereof, and means controlling the last mentioned mechanism to effect said vibratory movement independently of the control of said pattern.

53. In a machine tool having a work support and a tool support relatively movable for effecting a metal cutting operation, the combination of power operable driver means adapted to urge said relative movement, power operable brake means adapted to oppose said relative movement, interruptible power connections respectively for operation of said driver means and brake means, control means for said driver means operative during said cutting operation to alternately connect or interrupt said driver means power connection at predetermined rapidly recurrent intervals, and control means for said brake means operative to effect interruption of said brake means power connection during the intervals of connection of said driver means power connection and to effect connection of said brake means power connection during the intervals of interruption of the driver means power connection whereby to prevent overrun of said relative support movement.

54. The device of claim 3 comprising a single source of energy and means for diverting energy from said source alternately to said brake operating means and to said clutch actuating mechanism for the intermittent and alternative operation thereof.

55. In a copying machine the combination of a work support and a tool support, transmission mechanism for relative movement of said supports including a power operable driver mechanism, control means for said transmission mechanism including a tracer device providing elements relatively shiftable under the control of a pattern to different positions respectively effecting different transmission effects including movement of one of said supports, and other control means for said transmission including power operable vibrator means for effecting torsional vibration of a portion of said transmission connected with the last mentioned support and operating continuously during said tracer controlled movement thereof.

56. A copying machine as specified in claim 55 in which said transmission mechanism includes power operable brake means alternatively operable to oppose and release the movement of said portion of said transmission, and in which said other control means includes means for the alternate opposing and releasing operation of said brake at predetermined substantially constant intervals.

57. A copying machine as specified in claim 55 in which said transmission mechanism includes driving means and braking means each alternatively adjustable between effective and ineffective positions, and in which said other control means includes power means for said adjustment of the driving and braking means, and controller means for the power means for effecting said alternate adjustments of both the driving and driven means at predetermined substantially constant intervals with said effective positions alternating between the driving and driven means, whereby the one is effective while the other is ineffective.

58. In a copying machine the combination of a work support and a tool support, a transmission mechanism for relative movement of said supports including a clutch friction member and a brake friction member each connected by said transmission with the same support, a rotatable clutch friction element adapted for pressure friction engagement with said clutch member, a non-rotatable brake friction element adapted for pressure friction engagement with said brake member, power means for effecting said pressure friction engagement of each of said elements, control means for said transmission mechanism including a tracer device providing parts relatively movable under the control of a pattern to different positions respectively controlling said power means for effecting and interrupting the pressure friction engagement of said clutch element as determined by the pattern, and other transmission control means automatically controlling said power means for continuously alternately effecting and interrupting the pressure friction engagement of said brake element at predetermined substantially constant intervals.

59. A copying machine as recited in claim 58 in which said other transmission control means automatically controls said power means for alternately effecting and interrupting the pressure friction engagement of said clutch element at intervals such that said brake element and said clutch element are alternately in pressure friction engagement.

60. A copying machine as recited in claim 58 including means establishing a relatively light constant pressure friction engagement of each of said elements.

61. In a machine tool the combination of a work support and a tool support, transmission mechanism for relative movement of said supports including a power operable clutch and brake mechanism comprising driven means including a rotatable clutch friction member and a rotatable brake friction member each connected with one of said supports, a rotatable clutch friction element and a non-rotatable brake friction element respectively adapted for pressure friction engagement with said clutch member and with said brake member, and means for continuously effecting vibratory torsional deflection of one of said members relative to the other, whereby to alternately urge and restrain movement of said connected support, including means for effecting said pressure engagement of said clutch element, power means for effecting said pressure engagement of said brake element, and means automatically controlling said power means for alternately effecting the pressure engagement of said brake element followed by release thereof at predetermined substantially constant intervals.

62. A machine tool as recited in claim 61 including means for effecting relatively light constant pressure friction engagement of each of said clutch and brake elements.

EMIL R. LOCHMAN.